US011219922B1

(12) United States Patent
Straka et al.

(10) Patent No.: US 11,219,922 B1
(45) Date of Patent: *Jan. 11, 2022

(54) SUPERHYDROPHOBIC AND DUST MITIGATING COATINGS

(71) Applicant: United States of America as represented by the Administrator of NASA, Washington, DC (US)

(72) Inventors: Sharon Straka, Glenelg, MD (US); Kenneth O'Connor, Rockville, MD (US); Mark Hasegawa, Highland, MD (US); Boxi Chen, Riverside, MD (US); Nathaniel Patrick Hawthorne, Bryan, TX (US); Victoria Jane Pederzani Stotzer, Cincinnati, OH (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/566,127

(22) Filed: Sep. 10, 2019

Related U.S. Application Data

(63) Continuation-in-part of application No. 16/215,040, filed on Dec. 10, 2018, now Pat. No. 10,786,830, (Continued)

(51) Int. Cl.
*B05D 5/08* (2006.01)
*B05D 3/00* (2006.01)
(Continued)

(52) U.S. Cl.
CPC ............. *B05D 5/083* (2013.01); *B05D 3/002* (2013.01); *B05D 3/0254* (2013.01); *B05D 3/105* (2013.01);
(Continued)

(58) Field of Classification Search
CPC ................ C08K 3/36; C08K 2201/005; C08K 2201/011; C08K 2201/014; C09D 163/00;
(Continued)

(56) References Cited

U.S. PATENT DOCUMENTS

| 10,786,830 | B1 * | 9/2020 | Straka .................... B05D 3/002 |
| 2013/0216820 | A1 * | 8/2013 | Riddle .................... C09D 7/63 |
| | | | 428/313.9 |

OTHER PUBLICATIONS

Margiotta et al., The Lotus coating for space exploration—A dust mitigation tool, Proc. of SPIE, vol. 7794, pp. 77940I1-7, 2010.*
(Continued)

*Primary Examiner* — James M Mellott
(74) *Attorney, Agent, or Firm* — Matthew F. Johnston; Bryan A. Geurts; Helen M. Gaius

(57) ABSTRACT

A method is provided to form a dust mitigation coating that also mitigates or repels water, ice, and other liquids. Techniques to coat the surfaces of equipment and items with these dust, liquid, and ice mitigation coatings, minimize or eliminate mission problems caused by dust, liquid, or ice accumulation, particularly in outer space or on another planetary body or moon. Further, the dust mitigation coatings exhibit a Lotus-like effect, making the coated surfaces ultra-hydrophobic. The present invention is also directed to techniques for improving the functioning of terrestrial-based equipment and systems where dust, liquid, or ice accumulation is a problem, such as in hospitals and other health contexts, to prevent contamination.

19 Claims, 11 Drawing Sheets

Related U.S. Application Data which is a continuation-in-part of application No. 14/502,339, filed on Sep. 30, 2014, now abandoned.

(60) Provisional application No. 62/728,983, filed on Sep. 10, 2018.

(51) Int. Cl.
| | | |
|---|---|---|
| *B05D 3/02* | (2006.01) | |
| *B05D 3/10* | (2006.01) | |
| *B05D 7/00* | (2006.01) | |
| *C08K 3/36* | (2006.01) | |
| *C08L 23/28* | (2006.01) | |
| *C09K 3/18* | (2006.01) | |
| *C09K 3/22* | (2006.01) | |
| *C08L 63/00* | (2006.01) | |

(52) U.S. Cl.
CPC ............... *B05D 7/51* (2013.01); *C08K 3/36* (2013.01); *C08L 23/28* (2013.01); *C09K 3/18* (2013.01); *C09K 3/22* (2013.01); *B05D 2203/35* (2013.01); *B05D 2504/00* (2013.01); *B05D 2601/22* (2013.01); *C08K 2201/011* (2013.01); *C08L 63/00* (2013.01)

(58) Field of Classification Search
CPC ........ B05D 1/85; B05D 1/60; B05D 2203/35; B05D 2504/00; B05D 2601/22; B05D 7/51; B05D 7/586; B05D 3/002; B05D 3/0254; B05D 3/105; B05D 3/148; B05D 5/083; C03C 17/3405; C03C 2217/76; C08G 59/50; C08G 59/621; C08L 23/28; C08L 63/00; C09K 3/18; C09K 3/22
See application file for complete search history.

(56) References Cited

OTHER PUBLICATIONS

Jiang et al., Hypertransparent Nanostructured Superhydrophobic Self-Cleaning Coatings on Glass Substrates, Clean Technology 2008.*

* cited by examiner

SUPERHYDROPHOBIC AND DUST MITIGATING COATINGS

CROSS-REFERENCE TO RELATED APPLICATIONS

This application is a continuation-in-part application of U.S. patent application Ser. No. 16/215,040, filed Dec. 10, 2018, which in turn claims the benefit of U.S. patent application Ser. No. 14/502,339, entitled "SYSTEM, APPARATUS, COMPOSITION AND METHOD FOR SUPER-HYDROPHOBIC AND DUST MITIGATING COATINGS," filed Sep. 30, 2014, and which claims priority to U.S. Provisional Patent Application No. 62/728,983 entitled "SUPERHYDROPHOBIC AND DUST MITIGATING COATINGS," filed Sep. 10, 2018, and this application claims priority to U.S. Provisional Patent Application No. 62/728,983, filed Sep. 10, 2018, each of which is hereby incorporated herein by reference in its entirety.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefor.

BACKGROUND OF THE INVENTION

Field of the Invention

The present invention is in the technical field of coatings and other surfaces that mitigate or repel dust, other particulates, water, ice, and other liquids. The principles of the present invention are applicable to surfaces on apparatuses and in systems for commercial or scientific use, for space and planetary explorations, and for terrestrial uses, such as aeronautics, automotive, electronics, energy production, health-related, and ultra-pure environments.

Description of Related Art

The exploration of space requires people and equipment to uncover further mysteries of the Universe and its workings. One of the hazards of working on the moon is regolith or dust covering all surfaces. Dust problems are also pervasive on missions to Mars, asteroids, comets, and other planetary bodies. Indeed, the unknown health effects of moon dust were a great concern to the Apollo astronauts, NASA researchers, and Mission Control.

Data from the Apollo missions also show that the dust conditions on the surface of the moon substantially degraded the performance of the astronauts' extra-vehicular suits (EVSs), the extra-vehicular activities (EVAs) tools, mechanisms, spacecraft thermal control surfaces, and optical surfaces. Indeed, lunar regolith, in addition to being microscopic, is electrostatically charged and has jagged edges, making the dust extremely difficult to remove from any surface. The Apollo astronauts found that the dust transported and adhered everywhere, even throughout the interior habitations areas. Further, the astronauts identified dust accumulation on EVA suits and tools as a major problem that restricted motion and data collection, i.e., mission performance was degraded, and presented health concerns.

Dust control techniques developed during the Apollo missions were only partially successful. The more recent Mars land rover missions provided NASA scientists with information concerning how Martian dust can cause damage to mechanisms and, like moon dust, adversely affect mission performance, e.g., decommissioning the Mars Exploratory Rover Spirit. Martian dust has thus been identified as a major problem for future missions, including the ultimate human colonization of Mars. Accordingly, these historical data have resulted in NASA efforts, such as those of Applicants as set-forth in the instant application, to identify dust mitigation as a target area for all future Lunar and Martian missions.

Additionally, NASA develops and launches contamination sensitive missions, whereby particulate, liquid, and ice accumulation can degrade science or mission performance on orbit. This problem can limit the life of a mission. This is a particular concern on missions with contamination sensitive surfaces, such as optics, detectors, lasers systems, cryogenics, large-scale optics, radiators, or any surface that cannot be cleaned or that needs protection from water and ice buildup.

Furthermore, since particulate, liquid, and ice accumulation is a problem in various terrestrial industries as well, e.g., in clean environments, the need for better control of dust and other particulates, liquids, ice accumulation, and contaminants is manifest in, e.g., hospitals, microprocessor manufacturing, textile performance, automotive performance, solar array and wind turbine energy production, pharmaceutical manufacturing, aeronautical applications, clean rooms, and the like. Because the regolith and dust in general adversely affect health, the amelioration of this problem is necessary for future, long-duration space missions and explorations, as well as in more Earthly-based applications. Indeed, there is an immediate need for dust, liquid, and ice mitigation in numerous terrestrial contexts, as discussed further herein below. There is, therefore, a need for systems, equipment, compositions, and methods that provide dust, liquid, and ice mitigation or suppression capabilities, and that enable proper functioning in difficult and extreme situations and environments, whether on Earth, in space, or on another world.

SUMMARY OF THE INVENTION

The present invention is directed to a method employing enhanced lotus-like effect through super-hydrophobic coated surfaces to mitigate against the contamination or accumulation of dust, liquid, ice, and other debris. Additionally, the present invention is directed to techniques to coat the surfaces of optical components and other equipment with hydrophobic and super-hydrophobic coatings, minimizing or eliminating dust, liquid, and/or ice contamination or accumulation problems during missions in hostile environments, particularly, in outer space or on another planetary body or moon, not excluding Earth. Further, the hydrophobic and super-hydrophobic coatings exhibit an enhanced "lotus-like" effect by the combination of various processes implementing layering of nano-particle filled epoxy basecoats, and the use of self-assembling monolayers, epoxies, and epoxy resins. The present invention is also directed to techniques for improving the functioning of terrestrial-based equipment and systems where dust, liquid, or ice contamination or accumulation is a problem. Terrestrial-based equipment may be used in a wide range of applications such as, but not limited to the automotive, pharmaceutical, aeronautical, health, clean-room, energy production, cryogenic, and textile industries, to prevent contamination or accumulation of dust, liquid, and ice.

BRIEF DESCRIPTION OF THE DRAWINGS

While the specification concludes with claims particularly pointing out and distinctly claiming the subject matter that is regarded as forming the present invention, it is believed that the invention will be better understood from the following Detailed Description, taken in conjunction with the accompanying DRAWINGS, where like reference numerals designate like structural and other elements.

DETAILED DESCRIPTION OF THE INVENTION

The present invention will now be described more fully hereinafter with reference to the accompanying drawings, in which preferred embodiments of the invention are shown. It is, of course, understood, however, that this invention may be embodied in many different forms and should not be construed as limited to the embodiments set-forth herein; rather, these embodiments are provided so that the disclosure will be thorough and complete, and will fully convey the scope of the invention to those skilled in the art. It is, therefore, to be understood that other embodiments can be utilized, and structural changes can be made, without departing from the scope of the present invention.

Dust is ever-present and problematic both on Earth and elsewhere. Certain environments require the absence or reduction of dust in order to be able to function, e.g., in microprocessor manufacturing, clean rooms, and other ultra-clean facilities, where dust is harmful to the products. As discussed herein above and herein below, however, the mitigation of dust is useful in many contexts, including the health context, whether on Earth or on another heavenly body.

NASA has been at the forefront in mitigating the problems with contamination or accumulation of dust, liquid, and ice for decades. Various problems in regolith or dust particle accumulation have been directly found during lunar explorations by Apollo astronauts. In particular, analysis has shown that lunar dust exhibits physical properties that make the dust strongly adhere to any surface. Similarly, Mars also has dust with strong adherence properties, but, unlike the Moon, Mars has an atmosphere. Through long observations and in the rover explorations, Mars is known to have severe dust storms, making all equipment on the surface quite vulnerable to dust accumulation. The Mars Exploration Rover Spirit was lost recently due to dust accumulation on the solar panels. Although the instant invention has been developed primarily in the context of space exploration and the hazards thereof, dust, particulates, liquid, and ice contamination or accumulation are not desired in numerous terrestrial contexts as well, making the solutions set-forth in the present invention applicable universally.

Figure 1:
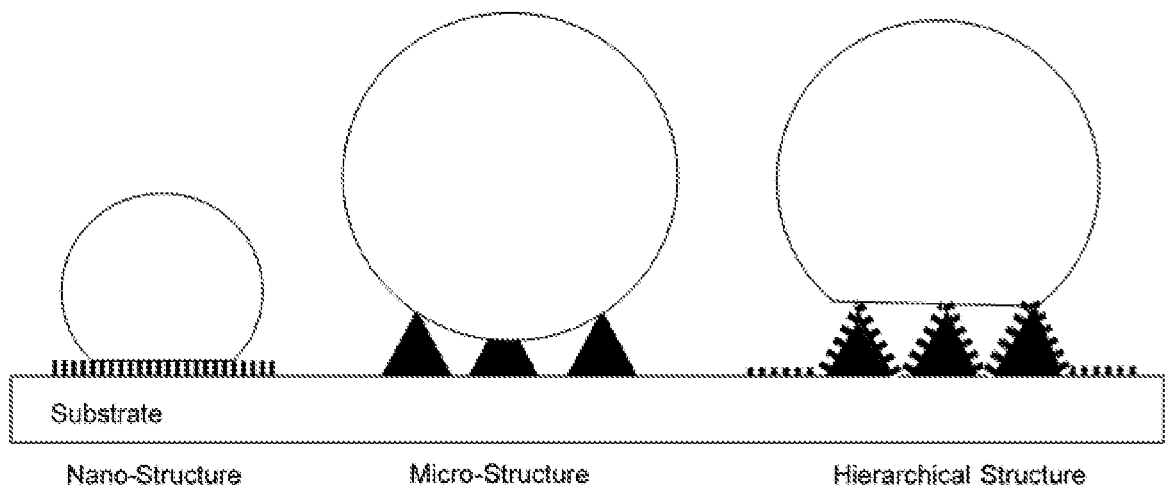
FIG. 1 is an illustration showing a droplet of a liquid or particle on the surface of a substrate coated with nano-structures (left), with microstructures (middle), and with a hydrophobic surface coating hierarchical structure combining micro-structures with nano-structures (right).
Figure 2:
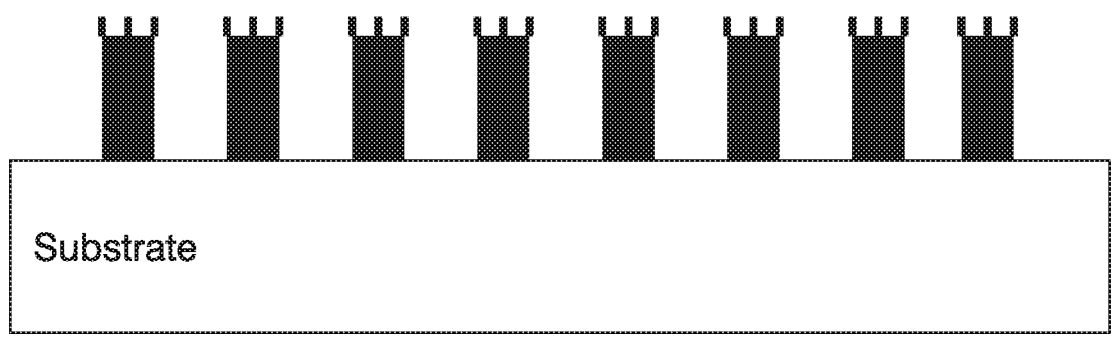
FIG. 2 is an illustration of an idealized structure of nano-textured micro pillars only attainable in a laboratory, but not viable for large-scale manufacturing production.

A purpose of the present invention is to address a large-scale problem of dust contamination and accumulation in dusty space environments, such as the moon, Mars, comets, asteroids, and other planetary bodies. Additionally, diverse coatings were developed to mitigate contamination or accumulation on missions where sensitive surfaces, such as large-scale optics, cannot be cleaned, or on surfaces that need protection from particulate, liquid, and ice buildup. Indeed, the present invention is a cross-cutting technology development that achieves self-cleaning hydrophobic and super-hydrophobic properties with particulate contact surface angles greater than 100 degrees. Hydrophobic and super-hydrophobic surface properties can be used on any mission or application where dust/particle contamination or accumulation degrades science or mission performance. The beneficial properties of the instant invention also have other applications, such as covering the interior of human habitats to minimize long-term contamination and debris build-up. Additionally, the coatings of the present invention are also suitable for other purposes within NASA and commercially. The concept of a Lotus coating, a dust mitigation coating, or hydrophobic coating is found in nature. The name "Lotus coating" addresses various hydrophobic and dust mitigation coatings. However, the present invention resolves limitations of current hydrophobic coating surfaces that are not operable for NASA space qualification standards and requirements, which factor-in durability of coating, stability in space environment (vacuum, ultra-violet, radiation, high-temperature, material degradation, outgassing), reproducibility, quality control, transmissivity, adhesion, and material application processes. Conventional high temperature commercial processes destroy substrates rendering them unusable for the contemplated purposes of the present invention. The present invention maintains its self-cleaning hydrophobic and super-hydrophobic coating properties despite the harsh space environment and space-born particulates' high adhesion properties. NASA space qualified hydrophobic and super-hydrophobic surfaces were achieved, per FIG. 1, with the use of hierarchical structure where micro-structures are coupled with nano-structures coatings to achieve the optimal surface contact angles. The invention herein overcomes the limitations of small-scale, laboratory-grown close to idealized nano-textured micro pillars, per FIG. 2, to make it easier to scale up for large-scale manufacturability of coatings with the use of randomly sized nano-particle coatings, per FIG. 3.

Prior art efforts over the past few years have resulted in various coatings that have hydrophobic or dust mitigation characteristics. These other techniques, however, require high temperatures to produce and apply, such as in combustion chemical vapor deposition (CCVD). The CCVD technique can damage or destroy sensitive spaceflight substrates, such as polyimide films. Furthermore, testing showed that prior art coatings produced by these other techniques were inconsistent and failed to survive harsh space flight environments. Additional efforts in wet chemistry formulations were also problematic, e.g., they involved hazardous chemicals and waste, required spin coating which creates uniformity issues and limits substrate size, or required high temperatures that put the viability of the substrates at risk.

The methods of the present invention have eliminated the use of hazardous materials by utilizing more user-friendly chemicals and safer procedures. The present invention also eliminated high temperature bakes, such as those experienced when creating nano-textures from polystyrene spheres, and high temperature exposures experienced during application processes utilizing CCVD techniques. Avoiding such high temperature baking processes facilitates the formation of nanoparticles that are more uniform in size and reduces the formation of multi-sized nanoparticles. Furthermore, the techniques of the present invention are applicable for spray coating surfaces, as well as brush coating, rub coating, spin coating, vacuum deposition, plasma etching, and combinations thereof.

The coatings of the present invention are durable enough to survive harsh space flight environments. The techniques of the instant invention also have to be extremely scalable in order to apply the coating to small surfaces, such as solar cells or lenses, as well as extremely large surfaces, such as human space habitats. The coatings and the application processes thus have to possess characteristics that do not compromise the underlying hardware surfaces. For space applications, these coatings must be durable and wear-resistant, must be able to be applied to large surfaces, must be optically clear for optics, must be transparent in the infrared wavelengths for thermal control surfaces, must exhibit low outgassing properties, must be stable in UV environments, and must be resistant to most solvents, yet be able to mitigate dust accumulation or prevent water or ice build-up.

The Lotus coating technique of the present invention utilizes a low temperature application process, for example, at a temperature of from 75° C. to 125° C., thereby preventing or eliminating surface damage to the underlying substrate. The coatings should also be stable under low vacuum environments, e.g., at pressures of from $1\times10^{-5}$ Torr to 100 Torr, in space radiation environments and charged particle environments, under extreme ultra-violet conditions, and under thermal cycling. Most importantly, these coatings must prevent particles and ice from adhering and must repel liquids. As mentioned, prior art techniques employ high temperature bakes or cures that may damage sensitive space flight hardware, utilize hazardous chemicals or processes, only coat small-scale surfaces through spin coating, and lack reproducibility, coating uniformity, or coating stability in space. Additionally, these prior art coatings applied through a combustion chemical vapor deposition (CCVD) process requiring a high temperature application, are scale limited, have reproducibility issues, and can damage spaceflight materials during application. The coatings and techniques of the present invention have thus been developed and overcome drawbacks of the prior art.

Dust mitigation coatings have, accordingly, been developed as a countermeasure for addressing the aforementioned problems of dust accumulation, such as for long-duration human space exploration on the Moon or Mars. In particular, the coating of the instant invention accomplishes dust mitigation with the nano-textured surface of the coating. The coating reduces the surface energy of the underlying surface, as well as the surface contacting area, which in turn drastically reduces the adhesion of particles and ice, and repels liquids.

Figure 4:
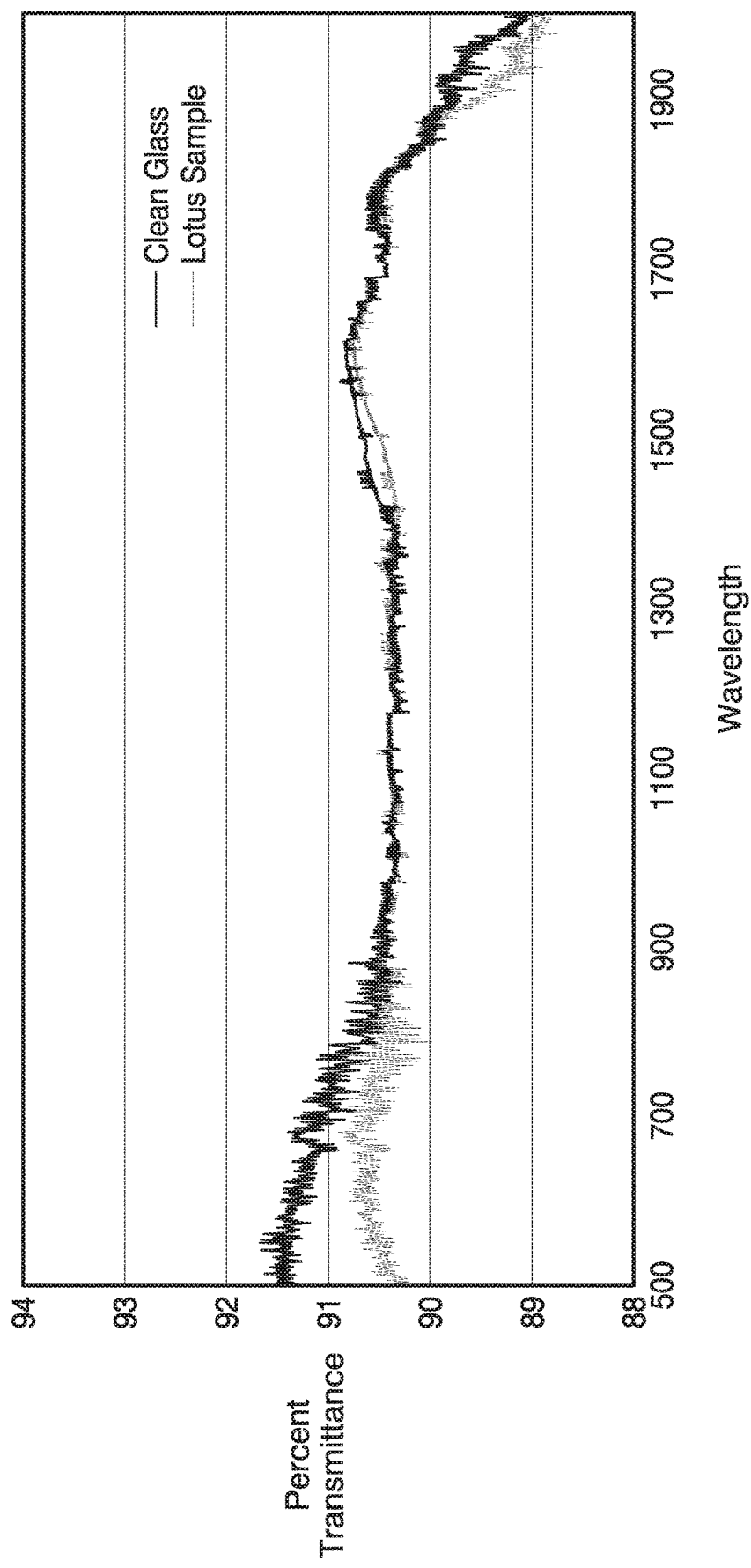
FIG. 4 is a transmittance graph generated with a Cary 5000 spectrophotometer where an embodiment of the present invention's hydrophobic coating with surface angle of 148° on a glass substrate is optimized at a specific wavelength to match the transmittance of a clean glass substrate.

As noted, the present invention is generally based upon the naturally occurring anti-contamination and water repellant surface properties of the Lotus plant leaf. In particular, the Lotus coatings of the present invention have a nano-textured surface similar to that exhibited by the Lotus plant leaf. As mentioned hereinabove, this nano-texture sheds dust and repels water by reducing surface energy and contact surface area. Table 1 shows a durability test where an optical coating hardness kit, per MIL-C-00675, was used to apply both 2 lbf of cheesecloth and 5 lbf of eraser onto a sample treated with a super-hydrophobic coating of the present invention described herein. In both tests, the super-hydrophobic coated sample maintained its super-hydrophobic properties where contact angles remained greater than or equal to 150° after at least 6 passes of the material onto the coated surface. In addition, FIG. 4 shows transmittance test results with a Cary 5000 spectrophotometer where a clean glass substrate was compared to a glass substrate coated with an embodiment of the present invention's hydrophobic coating that achieved a contact angle of 148°. Per FIG. 4, the hydrophobic coating was optimized at a specific wavelength to exhibit the same transmittance as the clean glass substrate. Finally, the embodiment of the present invention's super-hydrophobic coating was placed in a high vacuum chamber to observe the durability of the coating's contact angle in a space environment. When the substrate with the super-hydrophobic coating was exposed to a pressure of approximately $10^{-6}$ Torr at room temperature for four weeks in a VEECO™ chamber (Veeco Instruments Inc., Oyster Bay, N.Y.), there were no observable changes in appearance or in the contact angle of the coated substrate. The super-hydrophobic lotus-coated substrate had initially measured contact angles of between 153° and 150° after exposure to the cheesecloth test, and initial contact angles of between 154° and 145° after exposure to the eraser test.

TABLE 1

Durability Test Results

| 2 lbf Cheesecloth | | 5 lbf Eraser | |
| --- | --- | --- | --- |
| Pass | Contact Angle | Pass | Contact Angle |
| 0 | 153° | 0 | 154° |
| 1 | 153° | 1 | 146° |
| 2 | 151° | 2 | 151° |
| 3 | 150° | 3 | 145° |
| 4 | 151° | 4 | 151° |
| 5 | 150° | 5 | 151° |
| 6 | 150° | 6 | 152° |
| 7 | 151° | 7 | 147° |
| 8 | 151° | 8 | 145° |

It should be understood that the principles of the present invention may be made applicable in a wide range of situations, not necessarily the extremes of space exploration that is the subject of many of the studies herein. Indeed, the present invention may be employed not only in Earth's (or other extraterrestrial bodies') atmospheres, but also in countless terrestrial-based applications.

Indeed, the present invention includes an innovative coating that can be used to address a number of contamination related concerns. As discussed, the coating reduces the surface energy of the underlying surface, as well as the surface contacting area, which in turn drastically reduces the adhesion of particles and ice, and repels liquids. This formulation is thus more durable than the aforementioned previous formulations and does not significantly reduce transmission. The instant invention can be applied to both metallic and nonmetallic surfaces. The coating is vacuum compatible and can survive the harsh space environment. The coatings of the instant invention are easily cleanable using standard solvents or water.

There is a tremendous need for a flight-qualified, particulate, liquid, and ice mitigation coating that can survive extremely harsh space and aeronautical environments, as well as terrestrial environments. The coatings of the present invention thus help ensure mission performance when performing science and technology missions in potentially dusty terrains or in wet or ice-forming environments.

The present invention can also be easily adapted or modified to satisfy the requirements of a specific application. Depending on requirements, the coating systems of the present invention are more easily tailored to specific applications or environments than previous methods of the prior art. This customization makes the present invention far more adaptive, allowing for a more diverse range of applications. The adaptability of the coating embodiments of the present invention allow applicability to a variety of surfaces, such as, but not limited to, radiators, solar arrays, optics and lenses, reflectors, thermal control blankets, astronaut suits, habitat enclosures, fluid transport systems, launch vehicles, seals and gaskets, mechanisms, protective covers, laser systems, and the like.

As noted, missions to the moon, Mars, and other celestial bodies would greatly benefit from this technology development. By prioritizing the transmittance of the coating, the coatings and techniques of the present invention can be tailored for large-scale optics that cannot be cleaned after integration, to minimize particulate fall-out and keep mirrors clean during ground processing and launch. The present invention is able to address a major challenge for space exploration and for other cross-cutting missions where particulate, condensation, or ice accumulation causes performance degradation. The present invention also has aeronautical applications such as, but not limited to, preventing ice buildup on airplane wings and in airplane flap mechanisms. Additionally, the coating can be utilized in mitigating potential health and safety issues by controlling and reducing the amount of particles and repelling liquids in human habitation areas, such as in the International Space Station or in future exploration habitats.

Embodiment 1: Transparent Lotus Coating Suitable for Optics (WC2)

Figure 3:
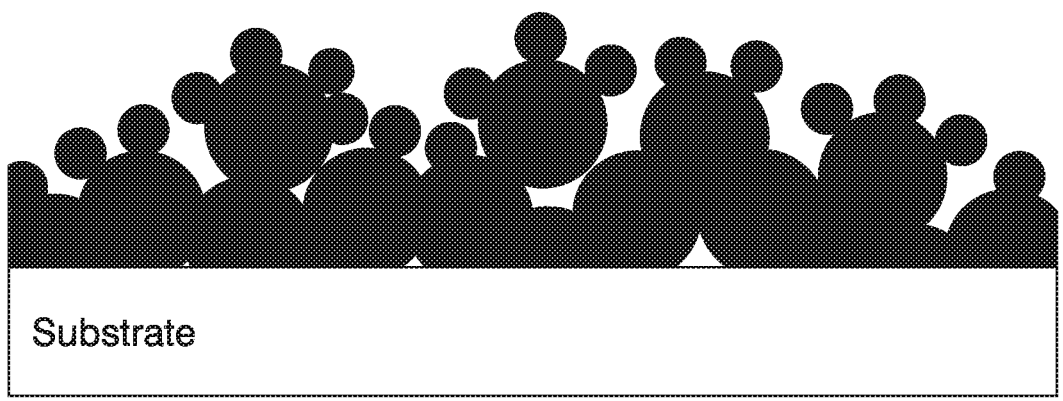
FIG. 3 is an illustration of a "lotus-like" structure of the present invention with different sized nano-particles, which is scalable for large manufacturing production or application, wherein the figure shows the designed texture, nano-particle clumping effect, and hierarchical structure.
Figure 5:
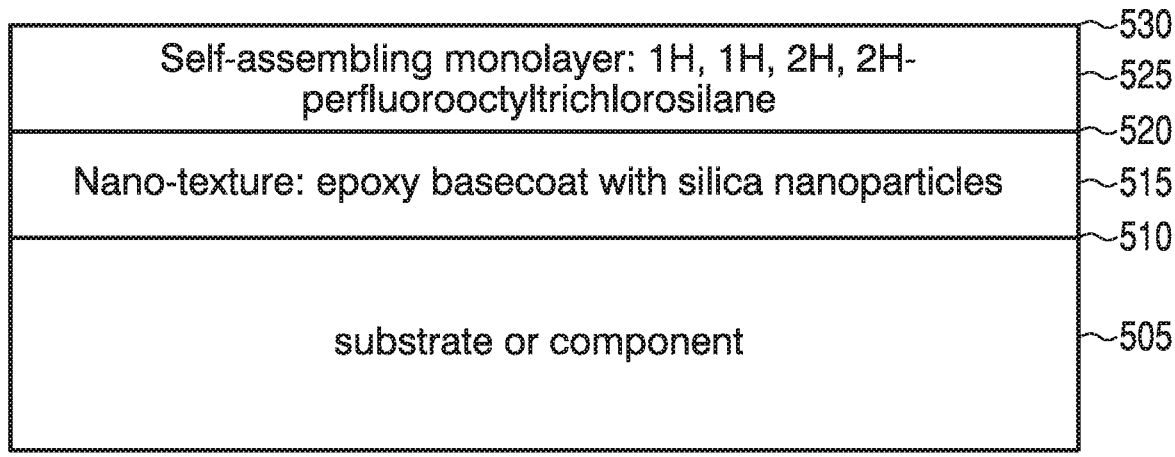
FIG. 5 is an illustration of an embodiment of a transparent lotus coating where reference numerals 515 and 525 depict the coating layers, reference numerals 510 and 520 depict the surfaces that end up as interfaces between the coating layers, and reference numeral 530 depicts the exterior surface of the coating.

FIG. 5. shows a transparent lotus coating suitable for optics, according to one embodiment of the present invention, wherein the lotus coating does not have, nor does it require, a primer layer between, e.g., a substrate 505 (e.g. glass) and a nano-texture epoxy basecoat 515 (epoxy basecoat). The epoxy basecoat comprises nanoparticles and produces a nano-textured surface and preferably utilizes several sizes of nano-particles to produce a clumping effect as illustrated in FIG. 3. A self-assembling monolayer is then applied to make the coating hydrophobic (water droplet contact angles greater than 90°) or super hydrophobic (water droplet contact angles greater than 150°). The method of making the transparent lotus coating of this embodiment is described below and can comprise, consist essentially of, or consist of, the steps listed herein. All embodiments of the methods of the present invention can comprise, consist essentially of, or consist of, the steps listed in the respective descriptions of the embodiments.

First, in this embodiment, epoxy basecoat 515 is created by mixing from 0.1 g to 0.5 g, preferably about 0.1 g, of silica nanoparticles in a 6:1 to 10:1 ratio, preferably an 8:1 ratio, of 15 nm particles to 80 nm particles, by mass. Also mixed to form the basecoat is 2 ml to 6 ml, preferably about 4 ml, of 4-to-1 TAP epoxy resin, 0.05 ml to 1.5 ml, preferably about 1 ml, of 4-to-1 TAP epoxy hardener, and 40 ml of OPTIMA™ grade acetone (Thermo Fisher Scientific, Rockville, Md.). The OPTIMA™ grade acetone is used to dilute the mixture of the epoxy basecoat 515, and the volume of 40 ml is not critical so long as the mixture is sufficiently diluted. The epoxy basecoat 515 produces the nano-texture and preferably utilizes several sizes of nano-particles to produce a clumping effect to the texture. It should be understood that other sized nanoparticles can be used, as well as other mix ratios, depending on the desired nano-texture.

Next, substrate 505 without the application of a primer layer is cleaned using standard low residue soap and distilled water at surface 510. Substrate 505 is then rinsed with acetone in preparation for the coating process at surface 510. In this embodiment, a bare glass substrate was utilized as substrate 505, although the coating can be applied to most substrates.

After substrate 505 is rinsed in acetone, epoxy/nanoparticle basecoat 515 is rubbed on the substrate at surface 510 using a lint-free nonwoven cotton wipe and allowed to flash off until the coating turns matte in appearance. This flash process can take a minimum of 5 to 10 seconds to occur, but may take longer. It should be noted that the application of epoxy basecoat 515 onto the surface of substrate 505 at surface 510 can be executed with other processes, such as, but not limited to, spray coating, brushing, or spin coating. After epoxy basecoat 515 becomes matte, the film is then rubbed with a second dry lint-free nonwoven cotton wipe to thin out epoxy basecoat 515 and render it transparent. This process generally occurs within 10 minutes of the rub-coating becoming matte, but other waiting periods can be utilized. In addition, other processes can be used to thin epoxy basecoat 515 other than the use of second dry lint-free nonwoven cotton wipes.

Substrate 505 coated with epoxy basecoat 515 is then baked at a temperature of 100° C. in air for about 30 minutes to allow the epoxy to cure and set. The curing temperature of nano-texture epoxy basecoat 515 can vary depending on the amount of time and temperature applied. Curing temperatures can vary between 75° C. and 125° C., with lower temperatures taking more time. The time period for curing can vary from 15 minutes to 45 minutes, but it needs to be of sufficient time for epoxy basecoat 515 to cure and set. Depending on the desired nano-texture, epoxy basecoat 515 can be applied in one or multiple layers.

Once substrate 505 with epoxy basecoat 515 is dry, a self-assembling monolayer 525 is applied to the substrate at surface 520 thus providing the coating's hydrophobic properties. Coated substrate 505 is then completely submerged in a solution comprising n-decane containing 0.4% 1H,1H,2H,2H-perfluorooctyltrichlorosilane (FOTS) by volume. In a preferred embodiment, this submerging occurs in an inert, dry environment and is allowed to occur for a period of time of from 15 to 45 minutes, for example, about 30 minutes. The submersion, or an alternative wetting process for substrates that cannot be submerged, allows self-assembling monolayer 525 to develop. The relative amount of FOTS in n-decane is not particularly limited, so long as FOTS is present in an amount sufficient to coat coated substrate 505. Further, instead of, or in addition to, FOTS, compounds such as perfluorodecyltrichlorosilane can be used in the present invention to coat coated substrate 505. The solution can comprise, consist essentially of, or consist of, 1H,1H,2H,2H-perfluorooctyltrichlorosilane, perfluorodecyltrichlorosilane, or any combination thereof.

As used herein, the term "monolayer" means a uniform, continuous, condensed, layer that is one molecule in thickness. As an example, the FOTS molecules can self-assemble on epoxy basecoat 515 during the submersion and self-assemble into a monolayer that is uniform and continuous across the surface of epoxy basecoat 515. This monolayer is one FOTS molecule in thickness. This definition of "monolayer" applies to all embodiments of this application, unless otherwise indicated.

Coated substrate 505 is then removed from the n-decane solution and rinsed with n-decane, followed by a rinse with chloroform, followed by a rinse with methanol, or similar chemical rinses. Rinse solvents are used in increasing polarity to clean off unreacted FOTS; thus, the solvents of n-decane, chloroform, and methanol are not required to be used in this rinsing. Other solvents can be used, so long as a rinsing of multiple solves takes place, where the solvents increase in polarity between individual rinsing steps. Rinsing can be done using a solvent squirt bottle, submersion, or similar cleaning process.

The rinsed coated substrate 505 with epoxy basecoat 515 and self-assembling monolayer 525 is then placed in an oven to bake in air at a temperature of 100° C. for a sufficient period of time, such as from 15 minutes to 45 minutes, preferably about 30 minutes. The baking process allows FOTS molecules in hydrophobic layer 525 to align. The oven temperature can vary, with lower temperatures requiring more time for the FOTS molecules to align. A preferred baking temperature range is from 75° C. to 125° C., for example, about 100° C.

This coating process yields surface water droplet contact angles of at least 90°, e.g. averaging at least 118°, or averaging 118°, at surface 530. The hydrophobic coating detailed in this embodiment is less than 2 μm thick. This coating is transparent and has been shown to be useful on optical components or any other applications requiring a clear coating.

Embodiment 2: Transparent Lotus Coating Suitable for Optics with Vacuum Deposition Layer (VAC)

Figure 6:
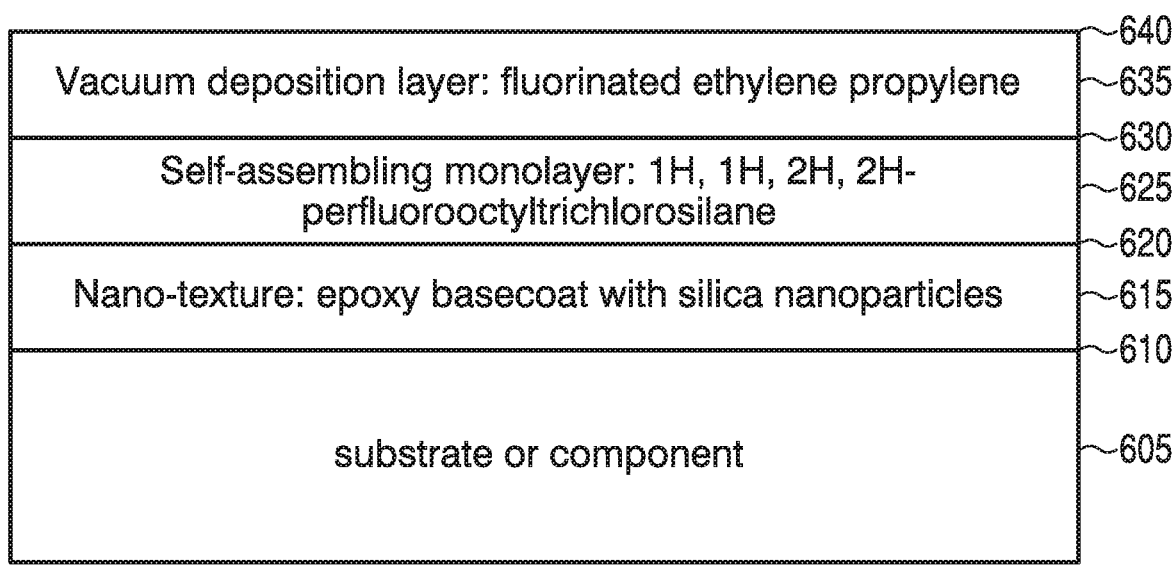
FIG. 6 is an illustration of an embodiment of a transparent lotus coating with vacuum deposition layer where the reference numerals 615, 625, and 635 depict the coating layers, reference numerals 610, 620, and 630 depict the surfaces that end up as interfaces between the coating layers, and reference numeral 640 depicts the exterior surface of the coating.

In this embodiment, an additional layer of vacuum deposited material may be applied to the "Transparent Lotus Coating Suitable for Optics" formulation detailed in Embodiment 1, and this embodiment can be seen in FIG. 6. It is noted that the vacuum deposition process further increases the durability and hydrophobic properties of the self-assembled monolayer, and in addition, unexpectedly increases, or improves, adhesion between the layer of the self-assembled monolayer and the vacuum deposition layer.

The adhesion of the vacuum deposition layer to the coating in Embodiment 1 also increased.

The method of making the transparent lotus coating of this embodiment is described as follows. First, a nano-textured epoxy basecoat 615 (epoxy basecoat) is created by mixing from 0.1 g to 0.5 g, preferably about 0.1 g, of silica nanoparticles having a 6:1 to 10:1 ratio, preferably an 8:1 ratio, of 15 nm particles to 80 nm particles by mass. Also mixed is 0.2 ml to 0.6 ml, preferably about 0.4 ml, of 4-to-1 TAP epoxy resin, 0.05 ml to 1.5 ml, preferably about 1 ml, of 4-to-1 tap epoxy hardener, and 40 ml of OPTIMA™ grade acetone. The OPTIMA™ grade acetone is used to dilute the mixture of epoxy basecoat 615, and the volume of 40 ml is not critical so long as the mixture is sufficiently diluted. Epoxy basecoat 615 produces the nano-texture and preferably utilizes several sizes of nano-particles to produce a clumping effect to the texture.

Next, a substrate 605, without a primer layer thereon, is cleaned with standard low residue soap and distilled water at surface 610. Substrate 605 is rinsed in acetone in preparation for the coating process at surface 610. In this embodiment, glass was utilized as a substrate, although the coating can be applied to most substrates.

After substrate 605 is rinsed in acetone, epoxy/nano-particle basecoat 615 is rubbed on the substrate at surface 610 with a lint-free nonwoven cotton wipe and allowed to flash off until the coating turns matte in appearance. This flash process can take a minimum of 5 to 10 seconds to occur but may take longer. It should be noted that the application of epoxy basecoat 615 onto the surface of substrate 605 at surface 610 can be executed with other processes, such as, but not limited to, spray coating, brushing, or spin coating. After epoxy basecoat 615 becomes matte, the film is then rubbed with a second dry lint-free nonwoven cotton wipe to thin out epoxy basecoat 615 and render it transparent. This process generally occurs within 10 minutes of the rub-coating becoming matte, but other waiting periods can be utilized. In addition, other processes can be used to thin epoxy basecoat 615 other than the use of second dry lint-free nonwoven cotton wipes.

Once substrate 605 is coated with epoxy basecoat 615, it is baked at a temperature of 100° C. in air for about 30 minutes to allow the epoxy coating to cure and set. The curing temperature for nano-texture epoxy basecoat 615 can vary depending on the amount of time and temperature applied. Curing temperatures can vary between 75° C. and 125° C., with lower temperatures taking more time. The time period for curing can vary from 15 minutes to 45 minutes, but it needs to be of sufficient time for epoxy basecoat 615 to cure and set. Depending on the desired nano-texture, epoxy basecoat 615 can be applied in one or multiple layers.

Once substrate 605 with epoxy basecoat 615 is dry, self-assembling monolayer 625 is applied to the coated substrate to give it its hydrophobic properties. Coated substrate 605 is submerged completely in a solution comprising n-decane containing 0.4% 1H,1H,2H,2H-perfluorooctyl-trichlorosilane (FOTS) by volume. Preferably, this process occurs in an inert, dry environment, and a time period for this submerging can be from 15 minutes to 45 minutes, for example, about 30 minutes. The submersion, or alternative wetting process for substrates that cannot be submerged, allows self-assembling monolayer 625 to develop. The relative amount of FOTS in n-decane is not particularly limited, so long as FOTS is present in an amount sufficient to coat coated substrate 605. Further, instead of, or in addition to, FOTS, compounds such as perfluorodecyltrichlorosilane can be used in the present invention to coat coated substrate 605.

The solution can comprise, consist essentially of, or consist of, 1H,1H,2H,2H-perfluorooctyltrichlorosilane, perfluorodecyltrichlorosilane, or any combination thereof.

Next, coated substrate 605 is removed from the n-decane solution and rinsed with n-decane, followed by a rinse with chloroform, followed by a rinse with methanol or similar chemical rinses. Rinse solvents are used in increasing polarity to clean off unreacted FOTS. Rinsing can be done using a solvent squirt bottle, submersion, or similar cleaning process.

Rinsed coated substrate 605 with epoxy basecoat 615 and self-assembling monolayer 625 thereon is then placed in an oven to bake in air at a temperature of 100° C. for about 30 minutes. The baking process allows FOTS molecules in hydrophobic layer 625 to align. The oven temperature can vary with lower temperatures requiring more time for the FOTS molecules to align. In one embodiment, the baking temperature is from 75° C. to 125° C. The time period for baking, in some embodiments, can be from 15 to 45 minutes.

After the baking process, to further optimize the durability, contact angle, and super-hydrophobic effects of FOTS self-assembling monolayer 625 at surface 630, the assembly of coated substrate 605 with epoxy basecoat 615 and self-assembling monolayer 625 is placed in a vacuum deposition chamber. The top surface of the FOTS at surface 630 of coated substrate 605 with epoxy basecoat 615 and self-assembling monolayer 625 is, additionally, coated with 75 nm to 125 nm, for example, about 100 nm, of fluorinated ethylene propylene 9494X (The Chemours Company, Wilmington, Del.) using a vacuum deposition process. The deposition can occur in a vacuum with a pressure of $10^{-5}$ Torr (e.g. $1\times10^{-5}$ to $9\times10^{-5}$ Torr) and at a deposition rate of from 15 to 25 µg/cm$^2$, preferably about 19 µg/cm$^2$, at surface 630. Other thicknesses of fluorinated ethylene propylene or similar material can be applied at alternative deposition rates to enhance the hydrophobic properties.

This variation of the embodiment produced water droplet contact angles of at least 90°, e.g., averaging at least 140°, or averaging 140°, at surface 640. With the addition of fluorinated ethylene propylene layer 635, the hydrophobic coating detailed in this embodiment is less than 2 µm thick, transparent, and particularly useful on optical components or any other applications requiring a clear coating.

Embodiment 3: Alternative Transparent Lotus Coating Suitable for Optics

Figure 7:
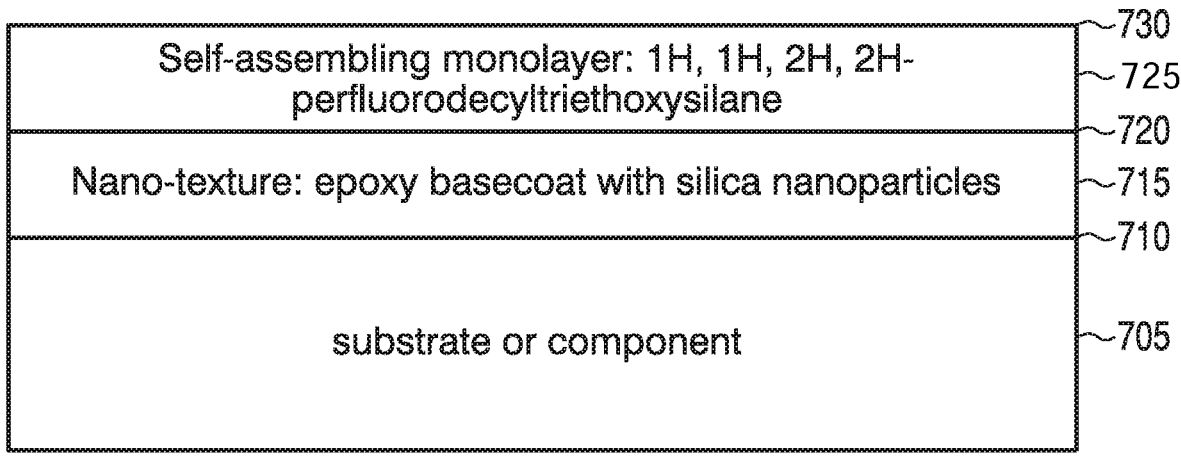
FIG. 7 is an illustration of an embodiment of an alternative transparent lotus coating where reference numerals 715 and 725 depict coating layers, reference numerals 710 and 720 depict the surfaces that end up as interfaces between the coating layers, and reference numeral 730 depicts the exterior surface of the coating.

This embodiment of the Lotus Coating does not have, nor does it require, a primer layer, and is schematically illustrated in FIG. 7. The epoxy basecoat produces the nano-texture and preferably utilizes several sizes of nano-particles to produce a clumping effect per FIG. 3. A self-assembling monolayer is then applied to make the coating hydrophobic (water droplet contact angles greater than 90 degrees) or super hydrophobic (water droplet contact angles greater than 150 degrees).

The method of making the transparent lotus coating of this embodiment is described as follows. Step one entails the creation of a nano-texture epoxy basecoat 715 (epoxy basecoat) by mixing from 0.55 g to 0.75 g, preferably about 0.66 g, of silica nanoparticles having a 6:1 to 10:1 ratio, preferably an 8:1 ratio, of 15 nm particles to 80 nm particles by mass. Also mixed is 0.2 ml to 0.6 ml, preferably about 0.4 ml, of 4-to-1 tap epoxy resin, 0.05 ml to 1.5 ml, preferably about 0.1 ml, of 4-to-1 tap epoxy hardener, and 50 ml of OPTIMA™ grade acetone. The OPTIMA™ grade acetone is used to dilute the mixture of epoxy basecoat 715, and the volume of 50 ml is not critical so long as the mixture is sufficiently diluted. Epoxy basecoat 715 produces the nano-texture and preferably utilizes several sizes of nano-particles to produce a clumping effect.

Step two entails cleaning a bare glass substrate 705, without the application of a primer layer, using standard low residue soap and distilled water at surface 710 of substrate 705, which will become surface 710. Next, the substrate is rinsed in acetone in preparation for the coating process at surface 710. In this embodiment, glass was the desired substrate.

Step three entails rubbing, with lint-free nonwoven cotton wipes, epoxy basecoat 715, from step one, onto the surface of the substrate at surface 710, from step two. The application of epoxy basecoat 715 onto substrate 705 at surface 710 induces epoxy basecoat 715 to flash off and turn matte in appearance. This rubbing process takes a minimum of 5 to 10 seconds to occur, but it may take longer. It should be noted that the application of epoxy basecoat 715 onto the surface of substrate 705 at 710 can be executed with other processes, such as spray coating, brushing, or spin coating. Next, once epoxy basecoat 715 becomes matte, a second set of dry lint-free nonwoven cotton wipes are used to thin out and render transparent epoxy basecoat 715. The thinning out process should occur within 10 minutes of epoxy basecoat 715 becoming matte; however, other application periods can be utilized. In addition, other processes can be used to thin epoxy basecoat 715 other than the use of second dry lint-free nonwoven cotton wipes.

Step four entails baking substrate 705 coated with epoxy basecoat 715 from step three, at a temperature of 100° C. for about 30 minutes to allow nano-texture epoxy basecoat 715 to cure and set. The curing temperature of nano-texture epoxy basecoat 715 can vary depending on the amount of time and temperature applied. Curing temperatures can vary between 75° C. and 125° C., depending on the cure time used. The time period for curing can vary from 15 minutes to 45 minutes, but it should be of sufficient time for nano-texture epoxy basecoat 715 to cure and set. Depending on the desired nano-texture, epoxy basecoat 715 can be applied in one or multiple layers.

In step five, once substrate 705 with epoxy basecoat 715 is dry, self-assembling monolayer 725 is applied to the coated substrate at the surface that will become interface 720 to give it its hydrophobic properties. In a preferred embodiment, substrate 705 with epoxy basecoat 715 thereon is completely submerged in a self-assembling monolayer 725 solution comprising ethanol, e.g., 200-proof ethanol, containing 0.2% to 0.6%, e.g. 0.4%, 1H,1H,2H,2H-perfluoro-decyltriethoxysilane (tri-ethoxy) by volume, for a period of time ranging from 12 to 20 hours, for example 16 hours, where this submerging takes place in an inert and dry environment. This submerging also develops a sufficient monolayer and submerging the substrate in this solution for additional time beyond the 20 hours was not found to produce better results. The submersion, or an alternative wetting process for substrates that cannot be submerged, allows self-assembling monolayer 725 to develop. The relative amount of tri-ethoxy in ethanol is not particularly limited, so long as tri-ethoxy is present in an amount sufficient to coat substrate 705. Further, instead of, or in addition to, tri-ethoxy, compounds such as 1H,1H,2H,2H-perfluorooctyltriethoxysilane and 1H,1H,2H,2H-perfluoro-decyltrimethoxysilane can be used in the present invention to coat substrate 705. The solution can comprise, consist essentially of, or consist of, 1H,1H,2H,2H-perfluorodecyl-triethoxysilane, 1H,1H,2H,2H-perfluorooctyltriethoxysi-lane, 1H,1H,2H,2H-perfluorodecyltrimethoxysilane, or any combination thereof.

Step six entails removing the assembly of coated substrate 705 with epoxy basecoat 715 from the self-assembling monolayer 725 solution, and rinsing it with 200-proof ethanol at surface 730. Next, it is then blown dry with clean dry air.

Step seven entails baking the assembly of rinsed and coated substrate 705 with epoxy basecoat 715 and self-assembling monolayer 725, in an oven and in air at a temperature of 100° C. for about 30 minutes. The baking process allows the tri-ethoxy molecules in hydrophobic layer 725 to align. In one embodiment, the baking temperature is from 75° C. to 125° C. The time period for baking, in some embodiments, can be from 15 to 45 minutes.

This coating process yields surface water droplet contact angles of at least 90°, e.g., averaging at least 120°, or averaging 120°, at surface 730. The hydrophobic coating that includes layers 715 and 725, detailed in this embodiment, is less than 2 μm thick, transparent, and particularly useful on optical components or for any other applications requiring a clear coating.

Figure 8:
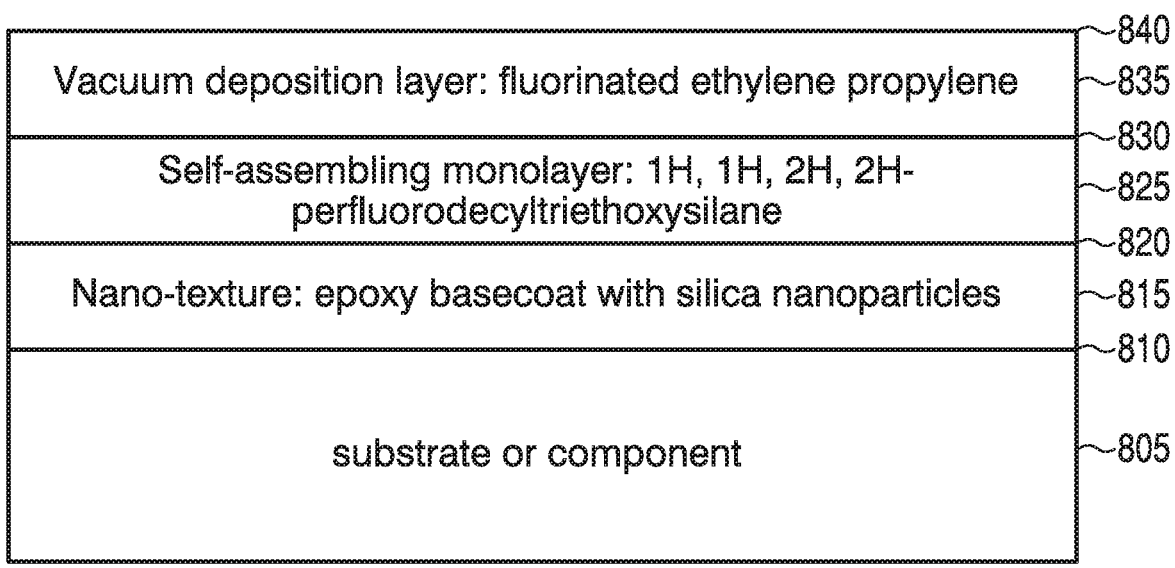
FIG. 8 is an illustration of an embodiment of an alternative transparent lotus coating with a vacuum deposition layer where reference numerals 815, 825, and 835 depict the coating layers, reference numerals 810, 820, and 830 depict the surfaces that end up as interfaces between the coating layers, and reference numeral 840 depicts the exterior surface of the coating.

Embodiment 4: Alternative Transparent Lotus Coating Suitable for Optics with Vacuum Deposition Layer In this embodiment, illustrated in FIG. 8, an additional layer of vacuum deposited material is applied to the "Alternative Transparent Lotus Coating Suitable for Optics" formulation detailed in Embodiment 3. It is noted that the self-assembled monolayer unexpectedly improved the adhesion of the vacuum deposition layer to the coating. This coating further improves the durability and hydrophobic effects of the "Alternative Transparent Lotus Coating Suitable for Optics" of Embodiment 3 with the addition of fluorinated ethylene propylene.

The method of making the transparent lotus coating of this embodiment is described as follows. Step one entails creating a nano-texture epoxy basecoat 815 (epoxy base-coat) by mixing 0.55 g to 0.75 g, preferably about 0.66 g, of silica nanoparticles having a 6:1 to 10:1 ratio, preferably an 8:1 ratio, of 15 nm particles to 80 nm particles by mass. Also mixed is 0.2 ml to 0.6 ml, preferably about 0.4 ml, of 4-to-1 tap epoxy resin, 0.05 ml to 1.5 ml, preferably about 0.1 ml, of 4-to-1 tap epoxy hardener, and 50 ml of OPTIMA™ grade acetone. The OPTIMA™ grade acetone is used to dilute the mixture of epoxy basecoat 815, and the volume of 50 ml is not critical so long as the mixture is sufficiently diluted. Epoxy basecoat 815 produces the nano-texture and preferably utilizes several sizes of nano-particles to produce a clumping effect.

Step two entails cleaning a bare glass substrate 805, that does not have a primer layer, with standard low residue soap and distilled water at surface 810 that will become interface 810. Next, substrate 805 is rinsed in acetone in preparation for coating with epoxy basecoat 815 at surface 810. In this embodiment, glass was the desired substrate.

Step three entails rubbing, with lint-free nonwoven cotton wipes, epoxy basecoat 815, from step one, onto the surface of the substrate at surface 810, from step two. The application of epoxy basecoat 815 onto substrate 805 at surface 810 induces epoxy basecoat 815 to flash off and turn matte in appearance. This rubbing process takes a minimum of 5 to 10 seconds to occur, but it may take longer. It should be noted that the application of epoxy basecoat 815 onto substrate 805 at surface 810 can be executed with other processes, such as spray coating, brushing, or spin coating. Next, once epoxy basecoat 815 becomes matte, a second set of dry lint-free nonwoven cotton wipes are used to thin out and render transparent epoxy basecoat 815. The thinning out process should occur within 10 minutes of epoxy basecoat 815 becoming matte; however, other application periods can be utilized. In addition, other processes can be used to thin epoxy basecoat 815 other than the use of second dry lint-free nonwoven cotton wipes.

Step four entails baking substrate 805 coated with epoxy basecoat 815 from step three, at a temperature of 100° C. for about 30 minutes to allow the coating to cure and set. The curing temperature for nano-texture epoxy basecoat 815 can vary depending on the amount of time and temperature applied. Curing temperatures can vary between 75° C. and 125° C. depending on the cure time used. The time period for baking, in some embodiments, can be from 15 to 45 minutes, but it needs to be of sufficient time for nano-texture epoxy basecoat 815 to cure and set. Depending on the desired nano-texture, epoxy basecoat 815 can be applied in one or multiple layers.

For step five, once substrate 805 with epoxy basecoat 815 is dry, self-assembling monolayer 825 is applied at surface at 820 to give it its hydrophobic properties. In a preferred embodiment, substrate 805 with epoxy basecoat 815 thereon is completely submerged in a self-assembling monolayer solution comprising 200-proof ethanol containing 0.4% 1H,1H,2H,2H-perfluorodecyltriethoxysilane (tri-ethoxy) by volume for a period of time ranging from 12 to 20 hours, for example 16 hours, where this submerging takes place in an inert and dry environment. The submersion, or wetting process, allows self-assembling monolayer 825 to develop. The relative amount of tri-ethoxy in ethanol is not particularly limited, so long as tri-ethoxy is present in an amount sufficient to coat substrate 805. Further, instead of, or in addition to, tri-ethoxy, compounds such as 1H,1H,2H,2H-perfluorooctyltriethoxysilane and 1H,1H,2H,2H-perfluorodecyltrimethoxysilane can be used in the present invention to coat substrate 805. The solution can comprise, consist essentially of, or consist of, 1H,1H,2H,2H-perfluorodecyltriethoxysilane, 1H,1H,2H,2H-perfluorooctyltriethoxysilane, 1H,1H,2H,2H-perfluorodecyltrimethoxysilane, or any combination thereof.

Step six entails removing coated substrate 805 with epoxy basecoat 815 from the self-assembling monolayer solution and rinsing it with 200-proof ethanol at surface 820. Next, it is then blown dry with clean dry air at surface 820.

Step seven entails baking the assembly of dry coated substrate 805 with epoxy basecoat 815 and self-assembling monolayer 825, in an oven, in air, and at a temperature of 100° C. for about 30 minutes. The baking process allows the tri-ethoxy molecules in hydrophobic layer 825 to align. The oven temperature can vary where lower oven temperature is given more time for the tri-ethoxy molecules to align. In one embodiment, the baking temperature is from 75° C. to 125° C. The time period for baking, in some embodiments, can be from 15 minutes to 45 minutes.

For step eight, after the baking process, to further optimize the durability, contact angle, and hydrophobic effects of tri-ethoxy self-assembling monolayer 825 at surface 830, coated substrate 805 with epoxy basecoat 815 thereon is placed in a vacuum deposition chamber. The top of layer 825 at surface 830, is, additionally, coated using vacuum deposition with 75 nm to 125 nm, preferably about 100 nm, of fluorinated ethylene propylene 9494X under $1 \times 10^{-5}$ to $9 \times 10^{-5}$ Torr at a deposition rate of from 15 to 25 µg/cm$^2$, preferably about 19 µg/cm$^2$, at surface 830.

This embodiment produced water droplet contact angles of at least 90°, e.g. averaging at least 144°, or averaging 144°, at surface 840. With the addition of fluorinated ethylene propylene layer 835, the composite hydrophobic coating 815, 825, and 835 detailed in this embodiment is less than 2 µm thick, transparent, and particularly useful on optical components or for any other applications requiring a clear coating.

Figure 9:
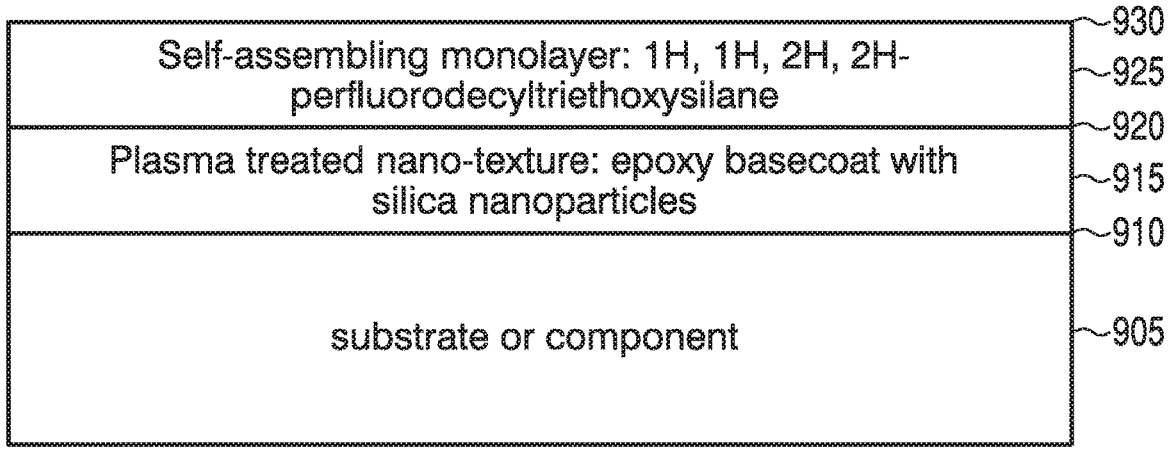
FIG. 9 is an illustration of an embodiment of a transparent plasma treated lotus coating where reference numerals 915 and 925 depict the coating layers, reference numerals 910 and 920 depict the surfaces that end up as interfaces between the coating layers, and reference numeral 930 depicts the exterior surface of the coating.

Embodiment 5: Plasma Treated Alternative Transparent Lotus Coating Suitable for Optics This embodiment of the Lotus Coating does not have, nor does it require, a primer layer, and is schematically illustrated in FIG. 9. Epoxy basecoat produces the nano-texture and preferably utilizes several sizes of nano-particles to produce a clumping effect per FIG. 3. A self-assembling monolayer is then applied to make the coating hydrophobic (water droplet contact angles greater than 90 degrees) or super hydrophobic (water droplet contact angles greater than 150 degrees).

The method of making the transparent lotus coating of this embodiment is described as follows. Step one entails the creation of a nano-texture epoxy basecoat 915 (epoxy basecoat) by mixing 0.55 g to 0.75 g, preferably about 0.66 g, of silica nanoparticles having a 6:1 to 10:1 ratio, preferably an 8:1 ratio, of 15 nm particles to 80 nm particles by mass. Also mixed is 0.2 ml to 0.6 ml, preferably about 0.4 ml, of 4-to-1 tap epoxy resin, 0.05 ml to 1.5 ml, preferably about 0.1 ml, of 4-to-1 tap epoxy hardener, and 50 ml of OPTIMA™ grade acetone. The OPTIMA™ grade acetone is used to dilute the mixture of epoxy basecoat 915, and the volume of 50 ml is not critical so long as the mixture is sufficiently diluted. Epoxy basecoat 915 produces the nano-texture and preferably utilizes several sizes of nano-particles to produce a clumping effect.

Step two entails cleaning a bare glass substrate 905, that does not include a primer layer, using standard low residue soap and distilled water, at surface 910. Next, the substrate is rinsed in acetone in preparation for the coating process at surface 910. In this embodiment, glass was the desired substrate.

Step three entails rubbing, with lint-free nonwoven cotton wipes, epoxy basecoat 915, from step one, onto the surface of the substrate at surface 910, from step two. The application of epoxy basecoat 915 onto substrate 905 at surface 910 induces epoxy basecoat 915 to flash off and turn matte in appearance. This rubbing process takes a minimum of 5 to 10 seconds to occur, but it may take longer. It should be noted that the application of epoxy basecoat 915 onto the substrate's surface at 910 can be executed with other processes, such as spray coating, brushing, or spin coating. Next, once epoxy basecoat 915 becomes matte, a second set of dry lint-free nonwoven cotton wipes are used to thin out and render transparent epoxy basecoat 915. The thinning out process should occur within 10 minutes of epoxy basecoat 915 becoming matte; however, other application periods can be utilized. In addition, other processes can be used to thin epoxy basecoat 915 other than the use of second dry lint-free nonwoven cotton wipes.

Step four entails baking substrate 905, coated with epoxy basecoat 915 from step three, at a temperature of 100° C. for about 30 minutes to allow the coating to cure and set. The curing temperature of nano-texture epoxy basecoat 915 can vary depending on the amount of time and temperature applied. Curing temperatures can vary between 75° C. and 125° C., depending on the cure time used. The time period for baking, in some embodiments, can be from 15 to 45 minutes, but it should be of sufficient time for nano-texture epoxy basecoat 915 to cure and set. Depending on the desired nano-texture, epoxy basecoat 915 can be applied in one or multiple layers.

For step five, once the assembly of substrate 905 with epoxy basecoat 915 thereon, is dry, it is placed in a plasma chamber with a pressure lower than $2.5 \times 10^{-3}$ Torr. Substrate 905 with epoxy basecoat 915 thereon at surface 920 is exposed to 10 minutes of oxygen plasma treatment at $3 \times 10^{-3}$ Torr, with 2000 volts, and modulating current under 0.2 Amps. The plasma process is repeated for the time duration. The oxygen plasma treatment enhances epoxy basecoat 915 properties and texture by exposing and cleaning the silica nano-particles at surface 920 prior to the application of self-assembling monolayer 925.

For step six, after oxygen plasma treatment at surface 920, self-assembling monolayer 925 is applied to the plasma treated nano-textured layer at surface 920 providing its hydrophobic properties. In a preferred embodiment, substrate 905 with epoxy basecoat 915 thereon is completely submerged in a self-assembling monolayer solution comprising 200-proof ethanol containing 0.4% 1H,1H,2H,2H-perfluorodecyltriethoxysilane (tri-ethoxy) by volume for a period of time ranging from 12 to 20 hours, for example 16 hours, where this submerging takes place in an inert and dry environment. The submersion, or wetting process, allows self-assembling monolayer 925 to develop. The relative amount of tri-ethoxy in ethanol is not particularly limited, so long as tri-ethoxy is present in an amount sufficient to coat epoxy basecoat 915. Further, instead of, or in addition to, tri-ethoxy, compounds such as 1H,1H,2H,2H-perfluorooctyltriethoxysilane and 1H,1H,2H,2H-perfluorodecyltrimethoxysilane can be used in the present invention to coat epoxy basecoat 915. The solution can comprise, consist essentially of, or consist of, 1H,1H,2H,2H-perfluorodecyltriethoxysilane, 1H,1H,2H,2H-perfluorooctyltriethoxysilane, 1H,1H,2H,2H-perfluorodecyltrimethoxysilane, or any combination thereof.

Step seven entails removing the assembly of coated substrate 905 with epoxy basecoat 915 thereon from the self-assembling monolayer solution, and rinsing it with 200-proof ethanol at surface 930. Next, it is then blown dry with clean dry air.

Step eight, which occurs after step seven, entails placing dry coated substrate 905 with epoxy basecoat 915 and self-assembling monolayer 925 thereon, in an oven to bake in air at a temperature of 100° C. for about 30 minutes. The baking process allows the tri-ethoxy molecules in hydrophobic layer 925 to align. In one embodiment, the baking temperature is from 75° C. to 125° C. The time period for baking, in some embodiments, can be from 15 minutes to 45 minutes.

This coating process yields surface water droplet contact angles of at least 90°, e.g. averaging at least 130°, or averaging 130°, at surface 930. Composite hydrophobic coating 915 and 925 detailed in this embodiment is less than 2 μm thick, transparent, and particularly useful on optical components or any other applications requiring a clear coating.

Figure 10:
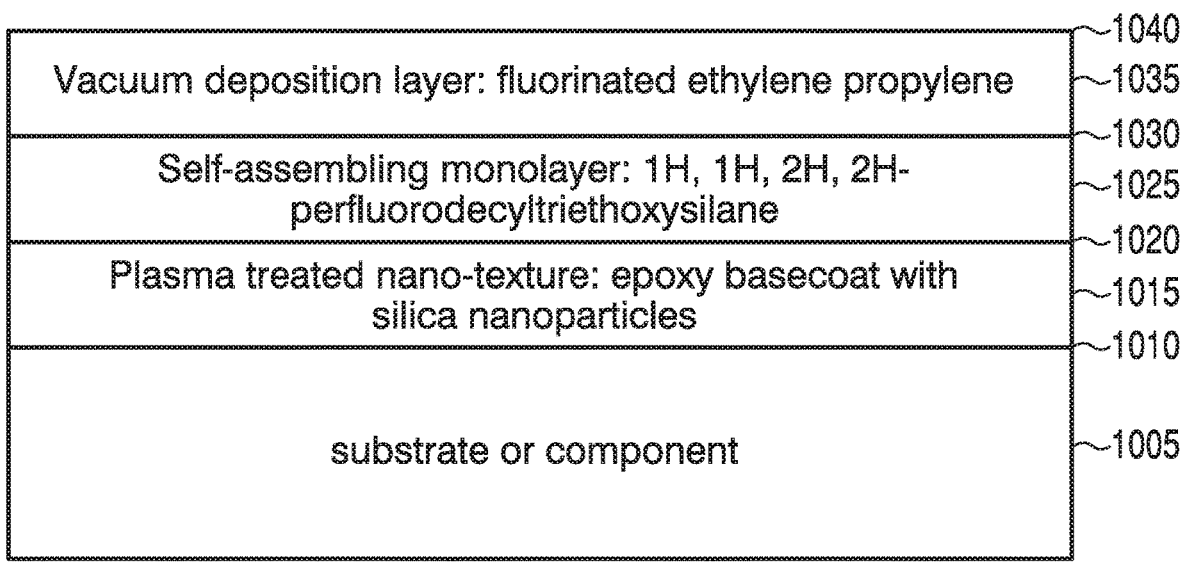
FIG. 10 is an illustration of an embodiment of a transparent plasma treated lotus coating with a vacuum deposition layer where reference numerals 1015, 1025, and 1035 depict the coating layers, reference numerals 1010, 1020, and 1030 depict the surfaces that end up as interfaces between the coating layers, and reference numeral 1040 depicts the exterior surface of the coating.

Embodiment 6: Plasma Treated Alternative Transparent Lotus Coating Suitable for Optics with Vacuum Deposition Layer In this embodiment, schematically illustrated in FIG. 10, an additional layer of vacuum deposited material may be applied to the "Plasma Treated Alternative Transparent Lotus Coating Suitable for Optics" formulation detailed in Embodiment 5, depending on desired coating properties, durability, desired contact angle, and final application.

The method of making the transparent lotus coating of this embodiment is described as follows. Step one entails creating a nano-texture epoxy basecoat 1015 (epoxy basecoat) by mixing 0.55 g to 0.75 g, preferably about 0.66 g, of silica nanoparticles having a 6:1 to 10:1 ratio, preferably an 8:1 ratio, of 15 nm particles to 80 nm particles by mass. Also mixed is 0.2 ml to 0.6 ml, preferably about 0.4 ml, of 4-to-1 tap epoxy resin, 0.05 ml to 1.5 ml, preferably about 0.1 ml of 4-to-1 tap epoxy hardener, and 50 ml of OPTIMA™ grade acetone. The OPTIMA™ grade acetone is used to dilute mixture of the epoxy basecoat 1015, and the volume of 50 ml is not critical so long as the mixture is sufficiently diluted. Epoxy basecoat 1015 produces the nano-texture and preferably utilizes several sizes of nano-particles to produce a clumping effect to the texture.

In step two, a bare glass substrate 1005, without the application of a primer layer, is cleaned using standard low residue soap and distilled water at surface 1010. Next, the substrate is rinsed in acetone in preparation for the coating process at surface 1010. In this embodiment, glass was the desired substrate; however, other substrate materials could be used.

Step three entails rubbing, with lint-free nonwoven cotton wipes, epoxy basecoat 1015, from step one, onto the surface of the substrate at surface 1010, from step two. The application of epoxy basecoat 1015 onto substrate 1005 at surface 1010 induces epoxy basecoat 1015 to flash off and turn matte in appearance. This rubbing process takes a minimum of 5 to 10 seconds to occur, but it may take longer. It should be noted that the application of epoxy basecoat 1015 onto the surface of substrate 1005 at 1010 can be executed with other processes, such as spray coating, brushing, or spin coating. Next, once epoxy basecoat 1015 becomes matte, a second set of dry lint-free nonwoven cotton wipes are used to thin out and render transparent epoxy basecoat 1015. The thinning out process should occur within 10 minutes of epoxy basecoat 1015 becoming matte. In addition, other processes can be used to thin epoxy basecoat 1015 other than the use of second dry lint-free nonwoven cotton wipes.

Step four entails baking substrate 1005, coated with epoxy basecoat 1015 from step three, at a temperature of 100° C. for about 30 minutes to allow the coating to cure and set. The curing temperature of nano-texture epoxy basecoat 1015 can vary depending on the amount of time and temperature applied. Curing temperatures can vary between 75° C. and 125° C., depending on the cure time used. The time period for baking, in some embodiments, can be from 15 to 45 minutes, but it should be of sufficient time for nano-texture epoxy basecoat 1015 to cure and set. Depending on the desired nano-texture, epoxy basecoat 1015 can be applied in one or multiple layers.

In step five, once substrate 1005 with epoxy basecoat 1015 is dry, it is placed in a plasma chamber with a pressure lower than $2.5 \times 10^{-3}$ Torr. Substrate 1005 with epoxy basecoat 1015 at surface 1020 is exposed to 10 minutes of oxygen plasma treatment at $3 \times 10^{-3}$ Torr, with 2000 volts, and modulating current under 0.2 Amps. The plasma process is repeated for the time duration. The oxygen plasma treatment enhances epoxy basecoat 1015 properties and texture by exposing and cleaning the silica nano-particles prior to the application of self-assembling monolayer 1025.

In step six, after oxygen plasma treatment at surface 1020, self-assembling monolayer 1025 is applied to the substrate at surface 1020 to give it its super-hydrophobic properties. In a preferred embodiment, substrate 1005 with epoxy basecoat 1015 thereon is completely submerged in a self-assembling monolayer solution comprising 200-proof ethanol containing 0.4% 1H,1H,2H,2H-perfluorodecyltriethoxysilane (tri-ethoxy) by volume for a period of time ranging from 12 to 20 hours, for example 16 hours, where this submerging takes place in an inert and dry environment. The submersion, or wetting process, allows the self-assembling monolayer to develop. The relative amount of tri-ethoxy in ethanol is not particularly limited, so long as tri-ethoxy is present in an amount sufficient to coat substrate 1005. Further, instead of, or in addition to, tri-ethoxy, compounds such as 1H,1H,2H,2H-perfluorooctyltriethoxysilane and 1H,1H,2H,2H-perfluorodecyltrimethoxysilane can be used in the present invention to coat substrate 1005. The solution can comprise, consist essentially of, or consist of, 1H,1H, 2H,2H-perfluorodecyltriethoxysilane, 1H,1H,2H,2H-perfluorooctyltriethoxysilane, 1H,1H,2H,2H-perfluorodecyltrimethoxysilane, or any combination thereof.

Step seven entails removing coated substrate 1005 with epoxy basecoat 1015 thereon from the self-assembling monolayer solution, and rinsing it with 200-proof ethanol at surface 1030. Next, it is then blown dry with clean dry air.

Step eight entails placing dried coated substrate 1005 with epoxy basecoat 1015 and self-assembling monolayer 1025 thereon in an oven to bake in air at a temperature of 100° C. for about 30 minutes. The baking process allows the tri-ethoxy molecules in super-hydrophobic layer 1025 to align. In one embodiment, the baking temperature is from 75° C. to 125° C. The time period for baking, in some embodiments, can be from 15 to 45 minutes.

In step nine, after the baking process, to further improve the durability, contact angle, and super-hydrophobic effects of tri-ethoxy self-assembling monolayer 1025 at surface 1030, coated substrate 1005 with epoxy basecoat 1015 thereon is placed in a vacuum deposition chamber. The top of layer 1025 at surface 1030 of substrate 1005, coated with epoxy basecoat 1015 is, additionally, coated with 75 nm to 125 nm, preferably about 100 nm, of fluorinated ethylene propylene 9494X, thereby forming layer 1035, under $1 \times 10^{-5}$ to $9 \times 10^{-5}$ Torr at a deposition rate of from 15 to 25 µg/cm², preferably about 19 µg/cm², at surface 1030.

This coating process yields surface water droplet contact angles of at least 150°, e.g., averaging at least 161°, or averaging 161°, at surface 1040. With the addition of the fluorinated ethylene propylene layer 1035, the composite hydrophobic coating 1015, 1025, and 1035 detailed in this embodiment is less than 2 µm thick, transparent, and particularly useful on optical components or any other applications requiring a clear coating.

Figure 11:
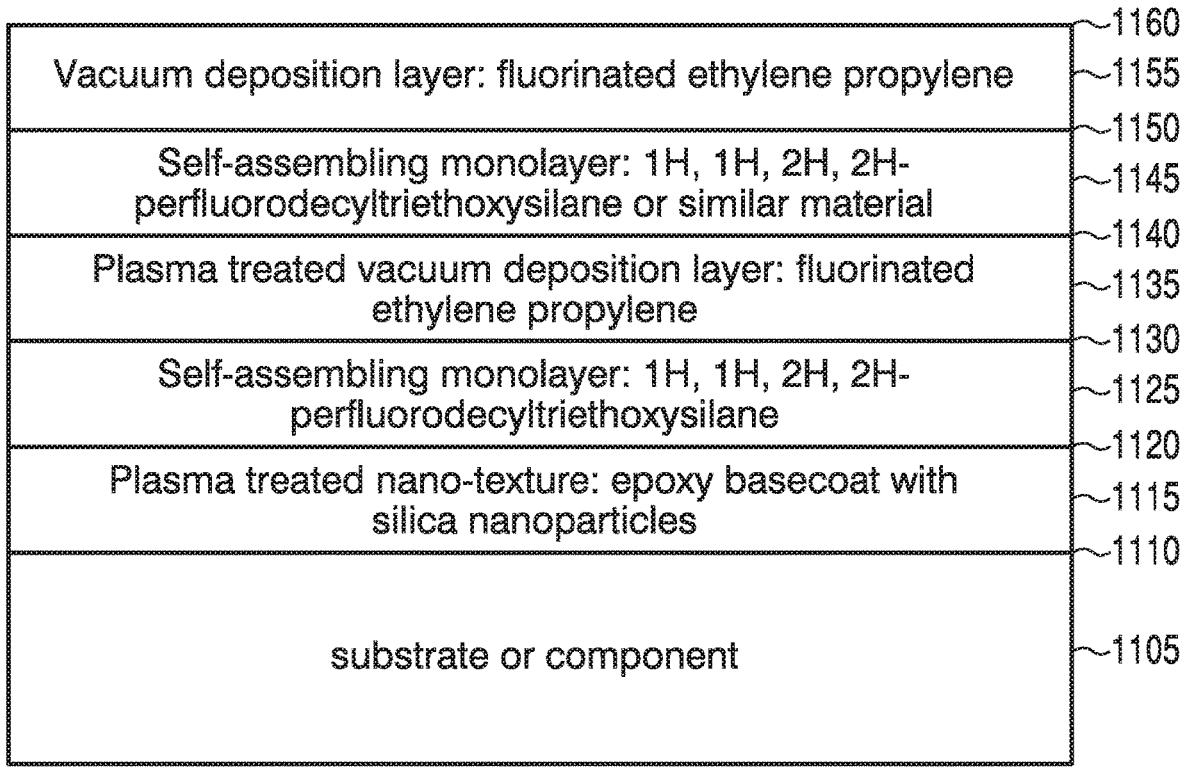
FIG. 11 is an illustration of an embodiment of a transparent double plasma treated lotus coating where reference numerals 1115, 1125, 1135, 1145, and 1155 depict the coating layers, reference numerals 1110, 1120, 1130, 1140, and 1150 depict the surfaces that end up as interfaces between the coating layers, and reference numeral 1160 depicts the exterior surface of the coating.

Embodiment 7: Double Plasma Treated Alternative Transparent Lotus Coating Suitable for Optics This embodiment of the Lotus Coating does not have, nor does it require, a primer layer, and is schematically illustrated in FIG. 11. The epoxy basecoat produces the nano-texture and preferably utilizes several sizes of nano-particles to produce a clumping effect per FIG. 3. A self-assembling mono-layer is then applied to make the coating hydrophobic (water droplet contact angles greater than 90 degrees) or super hydrophobic (water droplet contact angles greater than 150 degrees).

The method of making the transparent lotus coating of this embodiment is described as follows. Step one entails the creation of a nano-texture epoxy basecoat 1115 (epoxy basecoat) by mixing from 0.55 g to 0.75 g, preferably about 0.66 g, of silica nanoparticles having a 6:1 to 10:1 ratio, preferably an 8:1 ratio, of 15 nm particles to 80 nm particles by mass. Also mixed is 0.2 ml to 0.6 ml, preferably about 0.4 ml, of 4-to-1 tap epoxy resin, 0.05 ml to 1.5 ml, preferably 0.1 ml, of 4-to-1 tap epoxy hardener, and 50 ml of OPTIMA™ grade acetone. The OPTIMA™ grade acetone is used to dilute the mixture of epoxy basecoat 1115, and the volume of 50 ml is not critical so long as the mixture is sufficiently diluted. Epoxy basecoat 1115 produces the nano-texture and preferably utilizes several sizes of nano-particles to produce a clumping effect.

Step two entails cleaning a bare glass substrate 1105, that does not have a primer layer, using standard low residue soap and distilled water, at surface 1110. Next, the substrate is rinsed in acetone in preparation for the coating process at surface 1110. In this embodiment, glass was the desired substrate; however, other substrate materials can be used.

Step three entails rubbing, with lint-free nonwoven cotton wipes, epoxy basecoat 1115, from step one, onto the surface of the substrate at surface 1110, from step two. The application of epoxy basecoat 1115 onto substrate 1105 at 1110 induces epoxy basecoat 1115 to flash off and turn matte in appearance. This rubbing process takes a minimum of 5 to 10 seconds to occur, but it may take longer. It should be noted that the application of epoxy basecoat 1115 onto the substrate's surface at 1110 can be executed with other processes, such as spray coating, brushing, or spin coating. Next, once epoxy basecoat 1115 becomes matte, a second set of dry lint-free nonwoven cotton wipes are used to thin out and render transparent epoxy basecoat 1115. The thinning out process should occur within 10 minutes of epoxy basecoat 1115 becoming matte. In addition, other processes can be used to thin epoxy basecoat 1115 other than the use of second dry lint-free nonwoven cotton wipes.

Step four entails baking substrate 1105, coated with epoxy basecoat 1115 from step three, at a temperature of 100° C. for about 30 minutes to allow the coating to cure and set. The curing temperature of nano-texture epoxy basecoat 1115 can vary depending on the amount of time and temperature applied. Curing temperatures can vary between 75° C. and 125° C., depending on the cure time used. Depending on the desired nano-texture, epoxy basecoat 1115 can be applied in one or multiple layers. The time period for baking, in some embodiments, can be from 15 to 45 minutes, but it needs to be of sufficient time for nano-texture epoxy basecoat 1115 to cure and set.

In step five, once substrate 1105 with epoxy basecoat 1115 thereon is dry, it is placed in a plasma chamber with a pressure lower than $2.5 \times 10^{-3}$ Torr. Substrate 1105 with epoxy basecoat 1115 at surface 1120 is exposed to 10 minutes of oxygen plasma treatment at $3 \times 10^{-3}$ Torr, with 2000 volts, and modulating current under 0.2 Amps. The plasma process is repeated for the time duration. The oxygen plasma treatment enhances epoxy basecoat 1115 properties and texture by exposing and cleaning the silica nano-particles prior to the application of self-assembling monolayer 1125.

In step six, after oxygen plasma treatment at surface 1120, self-assembling monolayer 1125 is applied to the substrate at surface 1120 to give it its super-hydrophobic properties. In a preferred embodiment, substrate 1105 with epoxy basecoat 1115 thereon is completely submerged in a self-assembling monolayer solution comprising 200-proof ethanol containing 0.4% 1H,1H,2H,2H-perfluorodecyltriethoxysilane (tri-ethoxy) by volume for a time period ranging from 12 to 20 hours, for example 16 hours, where this submerging takes place in an inert and dry environment. The submersion or wetting process allows the self-assembling monolayer to develop. The relative amount of tri-ethoxy in ethanol is not particularly limited, so long as tri-ethoxy is present in an amount sufficient to coat substrate 1105. Further, instead of, or in addition to, tri-ethoxy, compounds such as 1H,1H,2H,2H-perfluorooctyltriethoxysilane and 1H,1H,2H,2H-perfluorodecyltrimethoxysilane can be used in the present invention to coat substrate 1105. The solution can comprise, consist essentially of, or consist of, 1H,1H,2H,2H-perfluorodecyltriethoxysilane, 1H,1H,2H,2H-perfluorooctyltriethoxysilane, 1H,1H,2H,2H-perfluorodecyltrimethoxysilane, or any combination thereof.

Step seven entails removing coated substrate 1105 with epoxy basecoat 1115 thereon from the self-assembling monolayer solution and rinsing it with 200-proof ethanol at surface 1130. Next, it is then blown dry with clean dry air.

Step eight entails placing dry, coated substrate 1105 with epoxy basecoat 1115 and self-assembling monolayer in an oven to bake in air at a temperature of 100° C. for a time period ranging from 15 minutes to 45 minutes, for example, about 30 minutes. The baking process allows the tri-ethoxy molecules in super-hydrophobic layer 1125 to align. A preferred baking temperature is from 75° C. to 125° C.

In step nine, after the baking process, to further improve the durability, contact angle, and super-hydrophobic effects of tri-ethoxy self-assembling monolayer 1125 at surface 1130, coated substrate 1105 with epoxy basecoat 1115 is placed in a vacuum deposition chamber. The top of layer 1125 at surface 1130 of the substrate coated with epoxy basecoat 1115 is, additionally, coated with 75 nm to 125 nm, preferably about 100 nm, of fluorinated ethylene propylene 9494X under $1\times10^{-5}$ to $9\times10^{-5}$ Torr at a deposition rate of from 15 to 25 µg/cm$^2$, preferably about 19 µg/cm$^2$, at surface 1130. In some embodiments, fluorinated ethylene propylene 9494X is vacuum deposited onto the FOTS and/or tri-ethoxy layer in a textured pattern. To create this textured pattern, the FOTS and/or tri-ethoxy coated substrate is masked with a screen, a mesh, a masking, or other material sufficient to form a pattern on the FOTS and/or tri-ethoxy coated substrate. Upon this masking, fluorinated ethylene propylene 9494X is vacuum deposited onto the masked substrate.

Step ten entails placing, after the vacuum deposition process, substrate 1105 with epoxy basecoat 1115, self-assembling monolayer 1125, and fluorinated ethylene propylene 9494X layer 1135, in a plasma chamber with a pressure lower than $2.5\times10^{-3}$ Torr. Fluorinated ethylene propylene 9494X layer 1135 at surface 1140 is exposed to 2 minutes, 30 seconds of oxygen plasma treatment at $3\times10^{-3}$ Torr, with 2000 volts, and modulating current under 0.2 Amps. The plasma process is repeated for the time duration. The oxygen plasma treatment enhances the properties and texture of the fluorinated ethylene propylene 9494X layer 1135 at surface 1140 through cleansing and cleaning prior to the application of self-assembling monolayer 1145. In one embodiment, for step ten, the pressure in the plasma chamber is not higher than $2.5\times10^{-2}$ Torr.

In step eleven, after oxygen plasma treatment at surface 1140, an additional self-assembling monolayer 1145 is applied to the top of fluorinated ethylene propylene 9494X layer 1135 at surface 1140 to further enhance its super-hydrophobic properties. In a preferred embodiment, substrate 1105 with epoxy basecoat 1115, self-assembling monolayer 1125, and fluorinated ethylene propylene 9494X layer 1135 thereon, is completely submerged in a self-assembling monolayer solution comprising 200-proof ethanol containing 0.4% 1H,1H,2H,2H-perfluorodecyltriethoxysilane (tri-ethoxy) by volume for a time period ranging from 12 to 20 hours, for example 16 hours, where this submerging takes place in an inert and dry environment. The submersion or wetting process allows the self-assembling monolayer to develop. The relative amount of tri-ethoxy in ethanol is not particularly limited, so long as tri-ethoxy is present in an amount sufficient to form layer 1145. Further, instead of, or in addition to, tri-ethoxy, compounds such as 1H,1H,2H,2H-perfluorooctyltriethoxysilane and 1H,1H,2H,2H-perfluorodecyltrimethoxysilane can be used in the present invention to form layer 1145. The solution can comprise, consist essentially of, or consist of, 1H,1H,2H,2H-perfluorodecyltriethoxysilane, 1H,1H,2H,2H-perfluorooctyltriethoxysilane, 1H,1H,2H,2H-perfluorodecyltrimethoxysilane, or any combination thereof.

Step twelve entails removing coated substrate 1105 with epoxy basecoat 1115, self-assembling monolayer 1125, and fluorinated ethylene propylene 9494X layer 1135, from the self-assembling monolayer solution and rinsing it with 200-proof ethanol at surface 1150. Next, it is then blown dry with clean dry air.

Step thirteen entails placing dry coated substrate 1105 with epoxy basecoat 1115, self-assembling monolayer 1125, fluorinated ethylene propylene 9494X layer 1135, and self-assembling monolayer 1145, in an oven to bake in air at a temperature of 100° C. for about 30 minutes. The baking process allows the tri-ethoxy molecules of super-hydrophobic layer 1145 to align. A baking temperature of 100° C. is one embodiment, and, in other embodiments, the baking temperature can be from 75° C. to 125° C.

In step fourteen, after the baking process, to further improve the durability, contact angle, and super-hydrophobic effects of tri-ethoxy self-assembling monolayer 1145 at surface 1150, coated substrate 1105 with epoxy basecoat 1115, self-assembling monolayer 1125, fluorinated ethylene propylene 9494X layer 1135, and self-assembling monolayer 1145, is placed in a vacuum deposition chamber. The top of layer 1145 at surface 1150 is, additionally, coated with 100 nm of fluorinated ethylene propylene 9494X (layer 1155) under $10^{-5}$ Torr (e.g. $1\times10^{-5}$ to $9\times10^{-5}$ Torr) at a deposition rate of from 15 to 25 µg/cm$^2$, preferably about 19 µg/cm$^2$, at surface 1150.

This coating process yields surface water droplet contact angles of at least 150°, e.g. averaging at least 170°, or averaging 170°, at surface 1160. With the addition of the fluorinated ethylene propylene 9494X layer 1155, the composite super-hydrophobic coating 1115, 1125, 1135, 1145, and 1155, detailed in this embodiment, is less than 2 µm thick, transparent, and particularly useful on optical components or for any other applications requiring a clear coating.

Embodiment 8: Durable Opaque Lotus Coating

Figure 12:
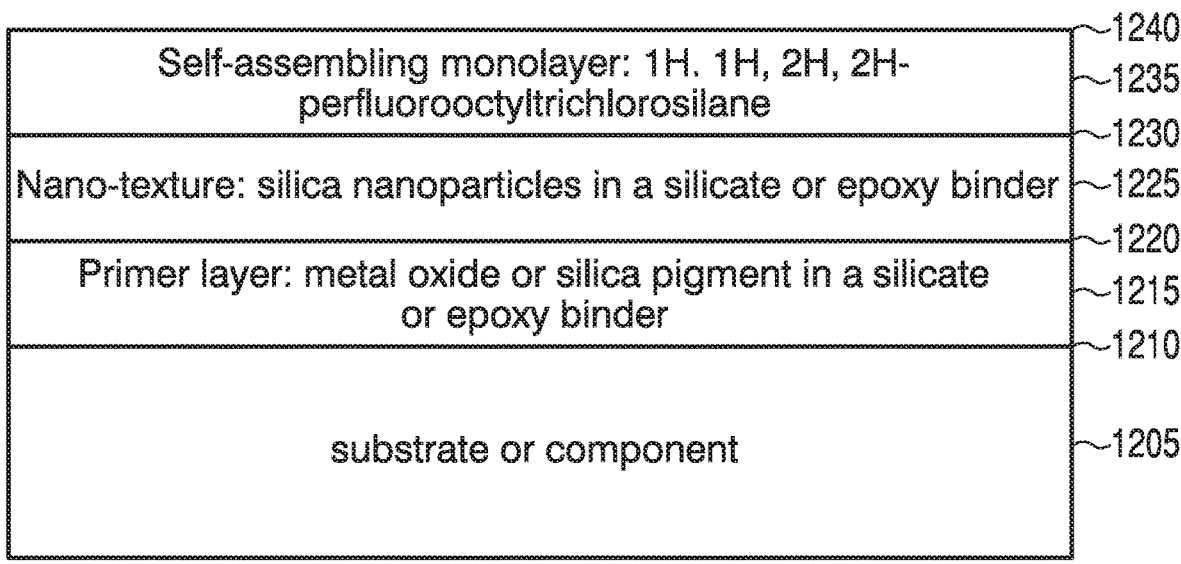
FIG. 12 is an illustration of an embodiment of a durable opaque lotus coating where reference numerals 1215, 1225, and 1235 depict the coating layers, reference numerals 1210, 1220, and 1230 depict the surfaces that end up as interfaces between the coating layers, and reference numeral 1240 depicts the exterior surface of the coating.

This embodiment of the Lotus Coating utilizes a primer layer for increased adhesion to a variety of substrates, as schematically illustrated in FIG. 12. The primer layer provides opaque characteristics to the coating. A silicate basecoat produces a nano-textured surface and preferably utilizes several sizes of nano-particles to produce a clumping effect per FIG. 3. A self-assembling monolayer is then applied to the silicate basecoat to make the coating hydrophobic (water droplet contact angles greater than 90 degrees) or super hydrophobic (water droplet contact angles greater than 150 degrees). Specimens of this embodiment were flown into space for experimental testing for a specified time and proved to withstand the harsh space environment with minimal degradation of its super-hydrophobic properties.

The method of making the lotus coating of this embodiment is described as follows. Step one entails the creation of an opaque nano-textured basecoat 1215 (silicate basecoat) by mixing 1.125 g of silica nanoparticles having a 6:1 to 10:1 ratio, preferably an 8:1 ratio, of 15 nm particles to 80 nm particles, by mass. The nano-particles are mixed with 1.7 g of LiNa-33 Silicate Binder, and then diluted with 32 ml of distilled water. The silicate basecoat 1215 produces the nano-texture and preferably utilizes several sizes of nano-particles to produce a clumping effect.

Step two entails cleaning a bare glass substrate 1205 that does not include a primer layer, with standard low residue soap and distilled water, at surface 1210. Next, the substrate is rinsed in acetone in preparation for the application of a primer layer 1215 at surface 1210. In this embodiment, glass was the desired substrate.

Upon cleaning substrate 1205 in step two, step three entails applying a primer layer 1215 that preferably includes metal oxide, silica pigment in silicate, or epoxy binder, to substrate 1205 at surface 1210. Primer 1215 used in this embodiment is an AZ Tech MLP-300™ Primer (AZ Technology, Huntsville, Ala.). Primer layer 1215 is spray coated, brushed, or spin coated on surface at 1210 of substrate 1205. It is possible to use, in some embodiments, a non-silicate-based primer.

Step four entails drying substrate 1205 with primer layer 1215 in air for approximately 10 to 30 minutes, preferably about 20 minutes. It is preferred that, for the MLP-300 primer, a 48-hour bake at 212° F. facilitates a full cure of the primer before advancing in this process. In other embodiments, the MLP-300 primer is allowed to dry for at least 12 hours in air at room temperature, with a preferred time of 24 to 50 hours, and at a temperature of from 185° F. to 250° F.

In step five, substrate 1205 with dried primer layer 1215 is preferably sprayed with a fog coat of silicate basecoat 1225 at surface 1220. It should be noted that the application of silicate basecoat 1225 onto the substrate 1205 with primer layer 1215 at surface 1220 can be executed with other processes, such as rub priming, brushing, or spin coating.

Step six entails drying silicate basecoat 1225 applied to substrate 1205 with primer layer 1215 for preferably 24 hours, but no less than 12 hours, in air at room temperature.

In step seven, once substrate 1205 with primer 1215 and silicate basecoat 1225 is dry, a self-assembling monolayer 1235 is applied to the substrate at surface 1230 to give it its super-hydrophobic properties. In a preferred embodiment, substrate 1205 with primer and silicate basecoat 1225 thereon is completely submerged in a self-assembling monolayer solution comprising n-decane containing 0.4% 1H,1H, 2H,2H-perfluorooctyltrichlorosilane (FOTS) by volume for a time period ranging from 15 minutes to 45 minutes, for example, about 30 minutes, which is sufficient time for formation of a monolayer with additional time yielding no additional benefits. This submerging takes place in an inert and dry environment. The submersion, or wetting process, allows self-assembling monolayer 1235 to develop. The relative amount of FOTS in n-decane is not particularly limited, so long as FOTS is present in an amount sufficient to coat silicate basecoat 1225. Further, instead of, or in addition to, FOTS, compounds such as perfluorodecyltrichlorosilane can be used in the present invention to coat silicate basecoat 1225.

Step eight entails removing the assembly of coated substrate 1205 with primer 1215 and silicate basecoat 1225 from the self-assembling monolayer solution and rinsing it in the following sequence of solvents at surface 1240. The first solvent used for rinsing coated substrate 1205 with primer 1215, silicate basecoat 1225, and self-assembling monolayer 1235, is n-decane; the second solvent is chloroform; and the third and last solvent is methanol.

Step nine entails placing the rinsed, coated substrate 1205 with primer 1215, silicate basecoat 1225, and self-assembling monolayer 1235, in an oven to bake in air at a temperature of 100° C. for at least about 30 minutes, preferably from 30 minutes to 60 minutes. The baking process allows the FOTS molecules in super-hydrophobic layer 1235 to align. In some embodiments, the baking temperature range is from 75° C. to 125° C.

This coating process yields surface water droplet contact angles of at least 150°, e.g. averaging at least 163°, or averaging 163°, at surface 1240. The super-hydrophobic composite coating 1215, 1225, and 1235, detailed in this embodiment, is less than 2 μm thick, translucent or opaque, and particularly useful on optical components or for any other applications not requiring an optically clear coating.

Embodiment 9: Durable Opaque Lotus Coating with Vacuum Deposition Layer

Figure 13:
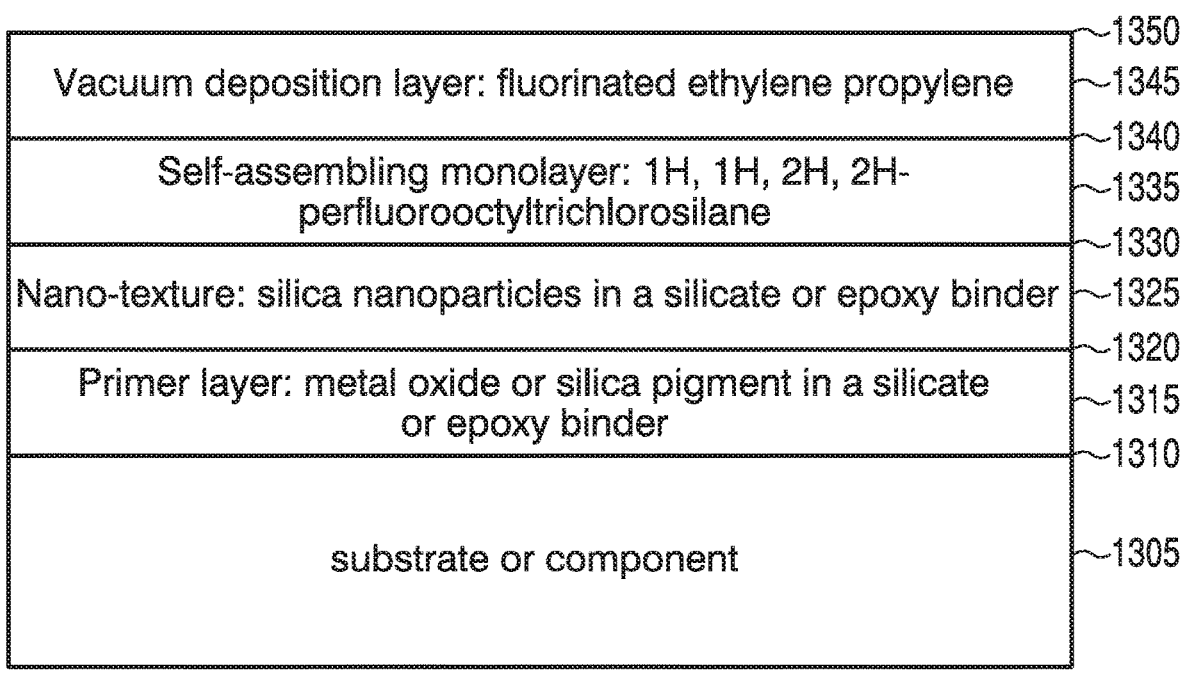
FIG. 13 is an illustration of an embodiment of a durable opaque lotus coating with a vacuum deposition layer where reference numerals 1315, 1325, 1335, and 1345 depict coating layers, reference numerals 1310, 1320, 1330, and 1340 depict the surfaces that end up as interfaces between the coating layers, and reference numeral 1350 depicts the exterior surface of the coating.

In this embodiment, as illustrated in FIG. 13, an additional layer of vacuum deposited material may be applied to the "Durable Opaque Lotus Coating" formulation detailed in Embodiment 8, depending on desired coating properties, durability, desired contact angle, and the final application.

The method of making the lotus coating of this embodiment is described as follows. Step one entails the creation of an opaque nano-textured basecoat 1315 (silicate basecoat) by adding 1.000 g to 1.150 g, preferably about 1.125 g, of silica nanoparticles having a 6:1 to 10:1 ratio, preferably an 8:1 ratio, of 15 nm particles to 80 nm particles by mass, to 1.7 g of LiNa-33 Silicate Binder, which is then diluted with 32 ml of distilled water. The amount of distilled water is not critical, but it needs to be enough to sufficiently dilute the opaque nano-textured basecoat 1315. The silicate basecoat 1315 produces the nano-texture and preferably utilizes several sizes of nano-particles to produce a clumping effect.

Step two entails cleaning a bare glass substrate 1305 that does not include a primer layer, with standard low residue soap and distilled water, at surface 1310. Next, the substrate is rinsed in acetone in preparation for the application of a primer layer 1315 at surface 1310. In this embodiment, glass was the desired substrate.

In step three, after substrate 1305 is cleaned, a primer layer 1315 that preferably includes metal oxide, silica pigment in silicate, or epoxy binder, is applied to substrate 1305 at surface 1310. Primer layer 1315 used in this embodiment is AZ Tech MLP-300™ Primer. Primer layer 1315 is spray coated, brushed, or spin coated on surface 1310 of substrate 1305.

Step four entails drying substrate 1305 with primer layer 1315 thereon, in air, for a period of time of from 10 to 30 minutes, preferably about 20 minutes.

Step five entails spraying substrate 1305, with dried primer layer 1315 thereon, with a fog coat of silicate basecoat 1325 at surface 1320. It should be noted that the application of silicate basecoat 1325 onto primer-coated substrate 1305 at surface 1320 can be executed with other processes, such as rub priming, brushing, or spin coating.

Step six entails drying silicate basecoat 1325 applied to substrate 1305 with primer layer 1315 for preferably 24 hours, but for no less than 12 hours, in air at room temperature.

In step seven, once substrate 1305 having primer layer 1315 and silicate basecoat layer 1325 is dry, a self-assembling monolayer 1335 is applied at surface 1330 to give it its super-hydrophobic properties at surface 1330. In a preferred embodiment, substrate 1305 with primer 1315 and silicate basecoat 1325 thereon is completely submerged in a self-assembling monolayer solution comprising n-decane containing 0.4% 1H,1H,2H,2H-perfluorooctyltrichlorosilane (FOTS) by volume for a period of time ranging from 15 minutes to 45 minutes, for example, about 30 minutes, where this submerging takes place in an inert and dry environment. The submersion, or wetting process, allows self-assembling monolayer 1335 to develop. The relative amount of FOTS in n-decane is not particularly limited, so long as FOTS is present in an amount sufficient to coat silicate basecoat 1325. Further, instead of, or in addition to, FOTS, compounds such as perfluorodecyltrichlorosilane can be used in the present invention to coat silicate basecoat 1325.

Step eight entails removing coated substrate 1305, with primer 1315, and silicate basecoat 1325, from the self-assembling monolayer solution, and rinsing it in a sequence of solvents at surface 1340. The first solvent used for rinsing the assembly of coated substrate 1305 with primer layer 1315, silicate basecoat 1325, and self-assembling monolayer 1335, is n-decane; the second solvent is chloroform; and the third and last solvent is methanol.

Step nine entails placing rinsed coated substrate 1305 having primer layer 1315, silicate basecoat 1325, and self-assembling monolayer 1335 thereon, in an oven to bake in air at a temperature of 100° C. for about 30 minutes. The baking process allows the FOTS molecules in super-hydrophobic layer 1335 to align. In one embodiment, the baking temperature is from 75° C. to 125° C. The time period for baking, in some embodiments, can be from 15 minutes to 45 minutes.

In step ten, after the baking process, to further improve the durability, contact angle, and super-hydrophobic effects of FOTS self-assembling monolayer 1335 at surface 1340, coated substrate 1305 having primer layer 1315, silicate basecoat 1325, and self-assembling monolayer 1335 thereon is placed in a vacuum deposition chamber. The top of layer 1335 at surface 1340 is, additionally, coated with 75 nm to 125 nm, preferably about 100 nm, of fluorinated ethylene propylene 9494X under $1\times10^{-5}$ to $9\times10^{-5}$ Torr at a deposition rate of from 15 to 25 $\mu g/cm^2$, preferably about 19 $\mu g/cm^2$, at surface 1350.

This coating process yields surface water droplet contact angles of at least 150°, e.g. averaging at least 167°, or averaging 167°, at surface 1350. The composite hydrophobic coating 1315, 1325, 1335, and 1345, detailed in this embodiment, is less than 2 $\mu m$ thick, translucent or opaque, particularly useful on mechanical components or for any other applications not requiring an optically clear coating.

Embodiment 10: Patterned Opaque Vacuum Deposition Layer on Lotus Coating

Figure 14:
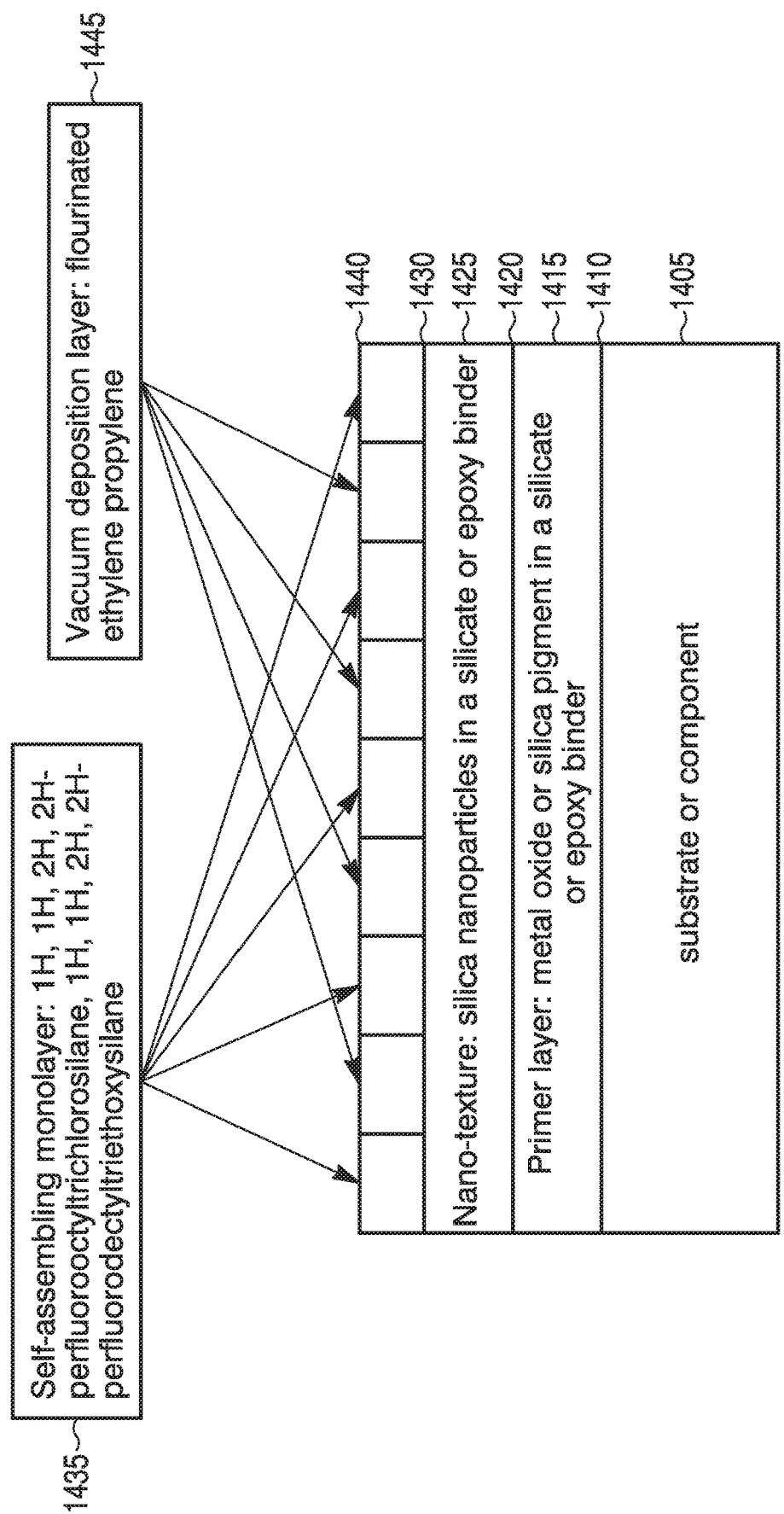
FIG. 14 is an illustration of another embodiment of a lotus coating with a patterned vacuum deposition layer where reference numerals 1415, 1425, 1435, and 1445 depict the coating layers, reference numerals 1410, 1420, and 1430 depict the surfaces that end up as interfaces between coating layers, and reference numeral 1440 depicts the exterior surface of the coating.

This embodiment of the Lotus Coating utilizes a primer layer for increased adhesion to a variety of substrates, as schematically illustrated in FIG. 14. The primer layer provides opaque characteristics to the coating. The silicate basecoat produces the nano-texture and preferably utilizes several sizes of nano-particles to produce a clumping effect per FIG. 3. A pattern of self-assembling monolayer and fluorinated ethylene propylene is created by using a masking process.

The method of making the lotus coating of this embodiment is described as follows. Step one entails the creation of an opaque nano-texture basecoat 1415 (silicate basecoat) by adding 1.100 g to 1.150 g, preferably about 1.125 g, of silica nanoparticles having a 6:1 to 10:1 ratio, preferably an 8:1 ratio, of 15 nm particles to 80 nm particles by mass, to 1.7 g of LiNa-33 Silicate Binder, which is then diluted with 32 ml of distilled water. The amount of distilled water is not critical, but it needs to be enough to sufficiently dilute the opaque nano-texture basecoat 1415 material. Silicate basecoat 1415 produces the nano-texture and preferably utilizes several sizes of nano-particles to produce a clumping effect.

Step two entails cleaning a bare glass substrate 1405, that does not include a primer layer, with standard low residue soap and distilled water, at surface 1410. Next, the substrate is rinsed in acetone in preparation of the application of a primer layer 1415 at surface 1410. In this embodiment, glass was the desired substrate.

In step three, after substrate 1405 is cleaned, a primer layer 1415 that preferably includes metal oxide, silica pigment in silicate, or epoxy binder, is applied to substrate 1405 at surface 1410. Primer 1415 used in this embodiment is AZ Tech MLP-300 Primer. Primer layer 1415 is spray coated, brushed, or spin coated on surface 1410 of substrate 1405.

Step four entails drying substrate 1405 with primer layer 1415 in air for approximately 20 minutes.

Step five entails spraying substrate 1405, with dried primer layer 1415 thereon, with a fog coat of silicate basecoat 1425 at surface 1420. It should be noted that the application of silicate basecoat 1425 onto substrate 1405 including primer layer surface 1420, can be executed with other processes, such as rub priming, brushing, or spin coating.

Step six entails drying silicate basecoat 1425 applied to substrate 1405 including primer layer 1415, for preferably 24 hours, but for no less than 12 hours, in air at room temperature.

In step seven, once substrate 1405 with primer 1415 and silicate basecoat 1425 is dry, a mask is placed on the top of silicate basecoat 1425 at surface 1430 to create a patterned FOTS or tri-ethoxy self-assembling monolayer 1435. The mask can be a screen, mesh, or other pattern. The masking process selectively masks, in a pattern, sections or areas of surface 1430 of silicate basecoat 1425.

In step eight, once the mask is placed on surface 1430 of silicate basecoat 1425, a self-assembling monolayer 1435 is applied to the exposed section or area of surface 1430 of silicate basecoat 1425 providing super-hydrophobic properties at surface 1440. In a preferred embodiment, substrate 1405 with primer 1415, and masked silicate basecoat 1425 thereon, is completely submerged in a self-assembling monolayer solution comprising n-decane containing 0.4% 1H,1H,2H,2H-perfluorooctyltrichlorosilane (FOTS) by volume, or ethanol (e.g. 200-proof ethanol) containing 0.4% tri-ethoxy, for a time period ranging from 15 minutes to 45 minutes, for example about 30 minutes, where this submerging takes place in an inert and dry environment. The submersion, or wetting process, allows self-assembling monolayer 1435 to develop. The relative amount of FOTS in n-decane is not particularly limited, so long as FOTS is present in an amount sufficient to coat silicate basecoat 1425. Further, instead of, or in addition to, FOTS, compounds such as perfluorodecyltrichlorosilane can be used in the present invention to coat silicate basecoat 1425.

Step nine entails removing the assembly of coated substrate 1405 with primer layer 1415, silicate basecoat 1425, and mask at surface 1430, from the self-assembling monolayer solution, and rinsing it in a sequence of solvents, at surfaces 1430 and 1440. The first solvent used for rinsing the assembled coated substrate 1405 with primer 1415, silicate basecoat 1425, and self-assembling monolayer 1435 solution, and mask at surface 1430, is n-decane; the second solvent is chloroform; and the third and last solvent is methanol.

Step ten entails baking, in an oven, rinsed and assembled coated substrate 1405 with primer 1415, silicate basecoat 1425, self-assembling monolayer 1435, and mask at surface 1430, in air at a temperature of 100° C. for about 30 minutes. The baking process allows the FOTS or tri-ethoxy molecules in super-hydrophobic layer 1435 to align. In one embodiment, the baking temperature is from 75° C. to 125° C. The time period for baking, in some embodiments, is from 15 minutes to 45 minutes.

In step eleven, after the baking process, the mask on top of silicate basecoat 1425 at surface 1430 is removed and surface 1430 of silicate basecoat 1425 has patterns of self-assembled monolayers 1435 at 1440. The patterns can comprise FOTS or tri-ethoxy and exposed silicate basecoat 1425 at surface 1430. Next, another mask, screen, mesh, or other pattern is placed on top of self-assembled monolayer 1435 (FOTS or tri-ethoxy) at surface 1440.

In step twelve, after the masking process, to further improve the durability, contact angle, and super-hydrophobic effects of the FOTS or tri-ethoxy self-assembling monolayer 1435, the assembled substrate 1405, coated with primer layer 1415, silicate basecoat 1425, self-assembling monolayer 1435 solution, and mask at surface 1440, is placed in a vacuum deposition chamber. The top of the exposed silicate basecoat layer 1425 at surface 1430 is coated with 75 nm to 125 nm, preferably about 100 nm, of fluorinated ethylene propylene 9494X under $1 \times 10^{-5}$ to $9 \times 10^{-5}$ Torr at a deposition rate of from 15 to 25 $\mu g/cm^2$, preferably about 19 $\mu g/cm^2$, at surface 1430.

In step thirteen, after the vacuum deposition process to form a fluorinated ethylene propylene layer 1445, the mask at surface 1440 is removed where a pattern of self-assembling monolayers 1435 (FOTS or tri-ethoxy) and fluorinated ethylene propylene layers 1445 is created on surface 1430 of silicate basecoat 1425.

The super-hydrophobic coating detailed in this embodiment is less than 2 μm thick, translucent or opaque, particularly useful on mechanical components or for any other applications not requiring an optically clear coating.

Embodiment 11: Patterned Transparent Vacuum Deposition Layer on Lotus Coating

Figure 15:
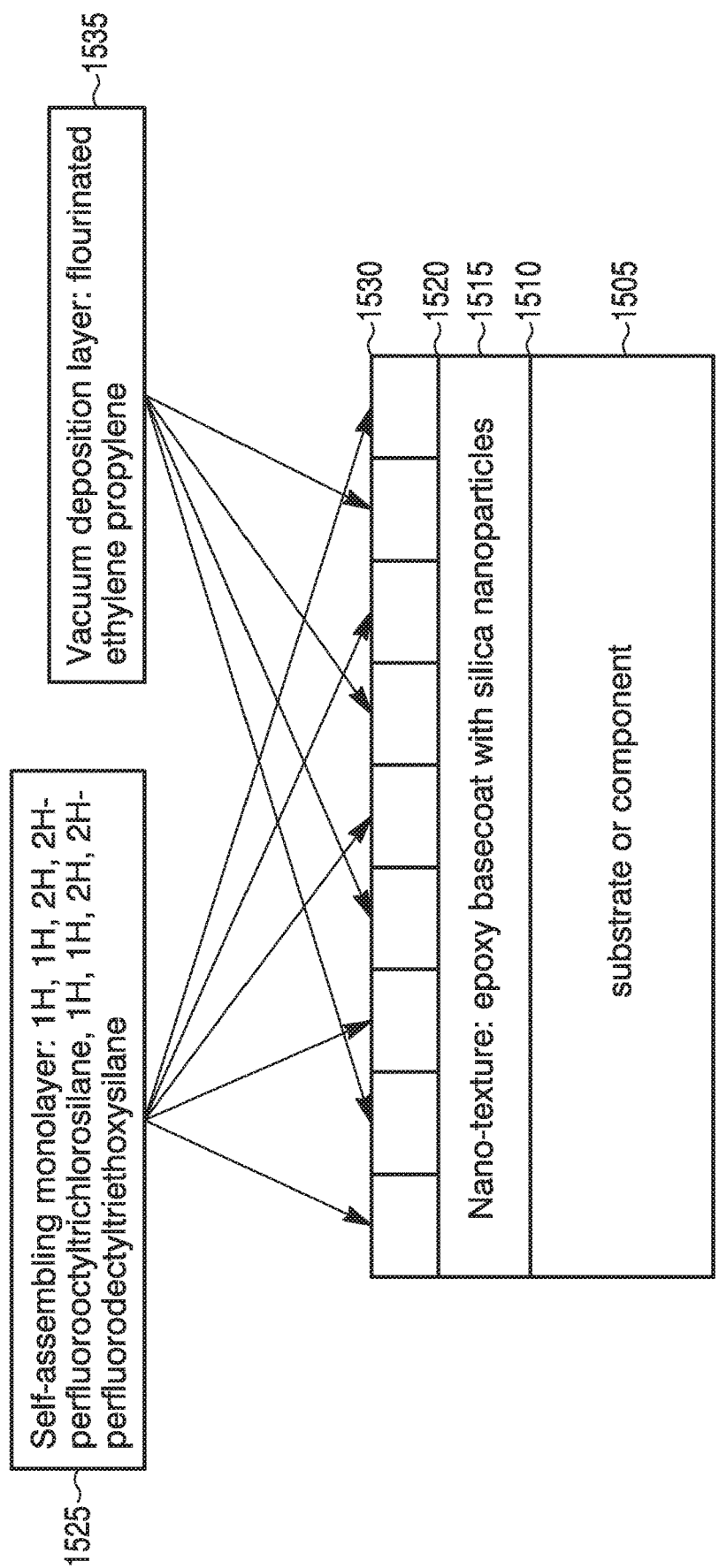
FIG. 15 is an illustration of another embodiment of a lotus coating with a patterned transparent vacuum deposition layer where reference numerals 1515, 1525, and 1535 depict the coating layers, reference numerals 1510 and 1520 depict the surfaces that end up as interfaces between coating layers, and reference numeral 1530 depicts the exterior surface of the coating.

This embodiment of the Lotus Coating does not have, nor does it require, a primer layer, and is schematically illustrated in FIG. 15. The epoxy basecoat produces a nano-texture and preferably utilizes several sizes of nano-particles to produce a clumping effect per FIG. 3. A pattern of self-assembling monolayer and fluorinated ethylene propylene is created by using a masking process.

The method of making the transparent lotus coating of this embodiment is described as follows. Step one entails the creation of a nano-textured epoxy basecoat 1515 (epoxy basecoat) by mixing 0.55 g to 0.75 g, preferably about 0.66 g, of silica nanoparticles having a 6:1 to 10:1 ratio, preferably an 8:1 ratio, of 15 nm particles to 80 nm particles by mass. Also mixed are 0.2 ml to 0.6 ml, preferably 0.4 ml, of 4-to-1 tap epoxy resin, 0.05 ml to 1.5 ml, preferably about 0.1 ml, of 4-to-1 tap epoxy hardener, and 50 ml of OPTIMA™ grade acetone. The OPTIMA™ grade acetone is used to dilute the mixture of the epoxy basecoat 1515, and the volume of 50 ml is not critical so long as the mixture is sufficiently diluted. Epoxy basecoat 1515 produces the nano-texture and preferably utilizes several sizes of nano-particles to produce a clumping effect.

Step two entails cleaning a bare glass substrate 1505, that does not include a primer layer, with standard low residue soap and distilled water, at surface 1510. Next, substrate 1505 is rinsed in acetone in preparation for the coating process at surface 1510. In this embodiment, glass was the desired substrate.

Step three entails rubbing, with lint-free nonwoven cotton wipes, epoxy basecoat 1515, from step one, onto the surface of the substrate at surface 1510, from step two. The application of epoxy basecoat 1515 onto substrate 1505 at surface 1510 induces epoxy basecoat 1515 to flash off and turn matte in appearance. This rubbing process takes a minimum of 5 to 10 seconds to occur, but it may take longer. It should be noted that the application of epoxy basecoat 1515 onto surface 1510 can be executed with other processes, such as spray coating, brushing, or spin coating. Next, once epoxy basecoat 1515 becomes matte, a second set of dry lint-free nonwoven cotton wipes are used to thin out and render transparent epoxy basecoat 1515. The thinning out process should occur within 10 minutes of epoxy basecoat 1515 becoming matte; however, other application periods can be utilized. In addition, other processes can be used to thin epoxy basecoat 1515 other than the use of second dry lint-free nonwoven cotton wipes.

Step four entails baking substrate 1505, coated with epoxy basecoat 1515 from step three, at a temperature of 100° C. for about 30 minutes to allow the coating to cure and set. The curing temperature for nano-textured epoxy basecoat 1515 can vary depending on the amount of time and temperature applied. Curing temperatures can vary between 75° C. and 125° C. depending on the cure time used. In some embodiments, the time period for curing can be from 15 minutes to 45 minutes, but it should be of sufficient time for nano-textured epoxy basecoat 1515 to cure and set. Depending on the desired nano-texture, epoxy basecoat 1515 can be applied in one or multiple layers.

In step five, after baking epoxy basecoat 1515 on substrate 1505, a mask is placed on silicate basecoat 1515 at surface 1520. The mask is used to create a pattern of FOTS or tri-ethoxy self-assembling monolayer material. The mask can be a screen, mesh, or other pattern. The masking process selectively masks, for example, in a pattern, sections or areas of surface 1520 of epoxy basecoat 1515.

In step six, once the mask is placed on surface 1520 of epoxy basecoat 1515, a self-assembling monolayer material 1525 is applied to the exposed section of surface 1520 of epoxy basecoat 1515 providing super-hydrophobic properties at surface 1530. In a preferred embodiment, substrate 1505 with masked epoxy basecoat 1515 thereon is completely submerged in a self-assembling monolayer solution comprising n-decane containing 0.4% 1H,1H,2H,2H-perfluorooctyltrichlorosilane (FOTS) by volume, or ethanol (e.g. 200-proof ethanol) containing 0.4% of tri-ethoxy, for a period of time ranging from 15 minutes to 45 minutes, for example, about 30 minutes, where this submerging takes place in an inert and dry environment. The submersion or wetting process allows self-assembling monolayer 1525 to develop. The relative amount of FOTS in n-decane is not particularly limited, so long as FOTS is present in an amount sufficient to coat substrate 1505. Further, instead of, or in addition to, FOTS, compounds such as perfluorodecyl-trichlorosilane can be used in the present invention to coat substrate 1505.

Step seven entails removing the assembled coated substrate 1505, epoxy basecoat 1515, and mask at surface 1520, from the self-assembling monolayer solution, and rinsing it in the following sequence of solvents at surface 1520 and 1530. The first solvent used for rinsing the coated substrate 1505 with epoxy basecoat 1515, self-assembling monolayer 1525, and mask located at 1520, is n-decane; the second solvent is chloroform; and the third and last solvent is methanol.

Step eight entails baking, in an oven, the rinsed and assembled substrate 1505, epoxy basecoat 1515, self-assembling monolayer 1525, and mask at surface 1520, in air at a temperature of 100° C. for about 30 minutes. The baking process allows the FOTS or tri-ethoxy molecules in super-hydrophobic layer 1525 to align. In one embodiment, the baking temperature is from 75° C. to 125° C. The time period for baking, in some embodiments, can be from 15 minutes to 45 minutes.

In step nine, after the baking process, mask 1520 is removed and the top of surface 1520 of epoxy basecoat 1515 has patterns of self-assembled monolayers 1525 at surface 1530. The patterns can comprise FOTS or tri-ethoxy and exposed epoxy basecoat 1515 at surface 1520. Next, another mask, screen, mesh, or other pattern is placed on top of self-assembled monolayer 1525 (FOTS or tri-ethoxy) at surface 1530 masking only the epoxy basecoat 1515 at surface 1520.

In step ten, after the masking process, to further optimize the durability, contact angle, and super-hydrophobic effects of the assembled FOTS or tri-ethoxy self-assembling monolayer 1525, coated substrate 1505, epoxy basecoat 1515, and self-assembled monolayer 1525, the assembly is placed in a vacuum deposition chamber. The top of exposed epoxy basecoat layer 1515 at surface 1520 is coated with 75 nm to 125 nm, preferably about 100 nm of fluorinated ethylene propylene 9494X under $1 \times 10^{-5}$ to $9 \times 10^{-5}$ Torr at a deposition rate of from 15 to 25 µg/cm$^2$, preferably about 19 µg/cm$^2$, at surface 1520.

In step eleven, after the vacuum deposition process of fluorinated ethylene propylene layer 1535, the mask at surface 1530 is removed and a pattern of self-assembled monolayers 1525 (FOTS or tri-ethoxy) and fluorinated ethylene propylene layers 1535 is created on surface 1520 of epoxy basecoat 1515.

The super-hydrophobic coating detailed in this embodiment is less than 2 µm thick, transparent, and particularly useful on optical components or for any other applications requiring a clear coating.

Figure 16:
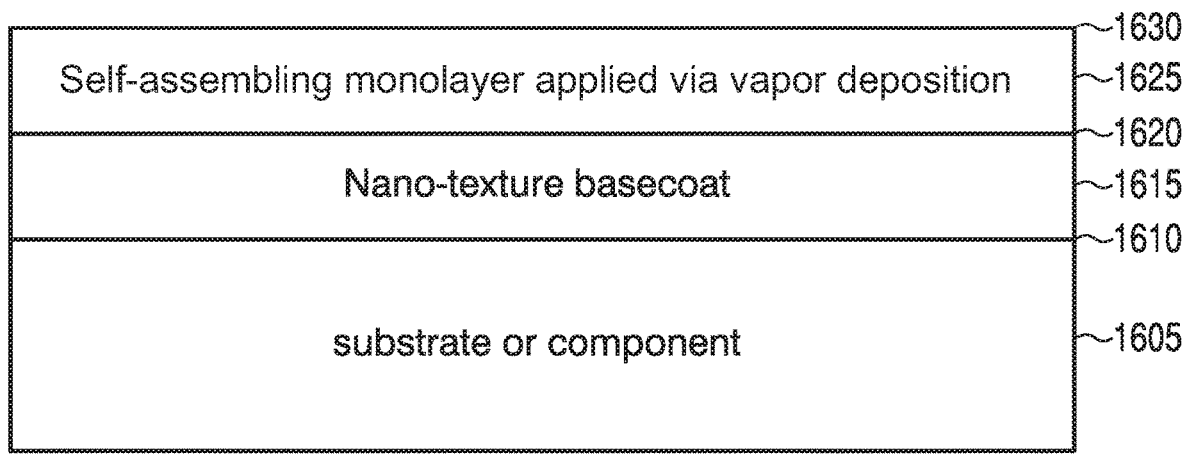
FIG. 16 is an illustration of another embodiment of a transparent lotus coating produced by the vapor deposition of a self-assembling monolayer where reference numerals 1615 and 1625 depict the coating layers, reference numerals 1610 and 1620 depict the surfaces that end up as interfaces between the coating layers, and reference numeral 1630 depicts the exterior surface of the coating.

Embodiment 12: Vapor Deposition of
Self-Assembling Monolayer in Production of
Transparent Lotus Coating In addition to the techniques described in the embodiments of Transparent Lotus Coatings, the self-assembling monolayer can be applied through a vapor deposition technique, as schematically illustrated in FIG. 16. The vapor deposition technique can enhance the clarity of the self-assembling monolayer. In this embodiment, the vapor deposited self-assembling monolayer can be applied directly after the application of the nano-textured epoxy basecoat. The vapor deposition process can replace and eliminate the dipping, submersion, spray coating, brushing, or spin coating steps in the wetting process of applying a self-assembling monolayer.

The method of making the self-assembling monolayer via vapor deposition is described as follows. Step one of the vapor deposition process occurs after the epoxy basecoat 1615 is baked. The step entails cleaning an aluminum weighing boat, effusion cell, or other suitable container, using isopropyl alcohol, or another appropriate solvent or cleaning material. The aluminum weighing boat will be used to contain the material for a self-assembling monolayer 1625 in order to facilitate the evaporation or outgassing of the silane.

In step two, 0.5 ml of 97% 1H,1H,2H,2H-perfluorodecyl-triethoxysilane (tri-ethoxy) or FOTS is poured into the aluminum boat. The volume of this solution is not critical, so long as it is enough to deposit tri-ethoxy or FOTS onto epoxy basecoat 1615, as described in step three as follows.

In step three, the aluminum weighing boat containing the tri-ethoxy or FOTS is placed in a vacuum bell jar or other vacuum chamber, along with substrate 1605, and previously applied epoxy basecoat 1615. A vacuum is pulled on the jar or chamber, until the approximate range of pressure is 10-100 Torr. The jar or chamber is sealed off from the vacuum pump and left undisturbed for 16 hours.

In step four, after the vapor deposition process, the jar or chamber is then vented with air. Next, coated substrate 1605 with epoxy basecoat 1615 and self-assembling monolayer 1625, is removed immediately and placed in an oven. The assembled coated substrate 1605 with the epoxy basecoat 1615 and self-assembling monolayer 1625 is baked for one hour at a temperature of 100° C. In other embodiments, the temperature for baking can be from 75° C. to 125° C.

The hydrophobic coating detailed in this embodiment is less than 2 µm, transparent, and particularly useful on optical components or for any other applications requiring a clear coating.

The embodiments of the present invention described herein use a substrate on which an epoxy layer is coated. In all embodiments of the present invention, the substrate is not particularly limited so long as the substance being used as the substrate can function as a substrate. Examples of the substrate include, but are not limited to, optical lenses, solar panels, multi-layer insulation (MLI), MLI blankets, glass, a polyimide surface (e.g. Kapton—duPont, Wilmington, Del.), a metal surface such as germanium, aluminum, silica, or an aluminum-silica mixture, or any combination thereof. In other embodiments, the substrate can be smooth, rough, patterned, lithographed, micro and/or nano featured, super-hydrophobic, textured, designed, printed, imprinted, porous, tubular, sintered, striated, reliefed, impressioned, hollowed, foamed edged, powdered, powder-coated, etched, selectively-located, embossed, woven, or non-woven. The substrate can comprise one or more of molded or formed surfaces, lotus-effect surfaces, electrowetting surfaces, laboratory vessels, fluidic devices, medical devices, powders, fibers, optical fibers, optical or electrical components, signal transmitters, signal receivers, signal reflectors, radomes, vehicular surfaces, architectural surfaces, antennae, microwave antennae, dishes, reflectors, signs, visual signaling devices, scanner windows, lenses, liquid crystal displays, electrowetting displays, 3D displays, and video displays.

Some of the embodiments of the present invention described herein have an epoxy layer comprising nano-particles that is bound to a surface of a substrate. In other embodiments of the present invention, this layer is preferred, but not required. Alternatively, a surface of a substrate to which the self-assembling monolayer, e.g. FOTS or tri-ethoxy, is applied, can be etched or shaped and the epoxy layer can be omitted. The etching or shaping can take place, e.g., by plasma etching, micro-machining, or laser-etching a surface. A combination of these techniques can be used. Further, as an option, a surface of a substrate can be surface etched or shaped and have an epoxy layer applied to the etched or shaped surface.

In embodiments described herein, the epoxy layer is created by mixing silica nanoparticles, an epoxy resin (e.g. TAP epoxy resin), an epoxy hardener (e.g. TAP epoxy hardener), and a solvent (e.g. acetone). The epoxy resin, hardener, and solvent are not particularly limited so long as they are sufficient to form a usable nano-textured epoxy basecoat having nanoparticles dispersed therein and that can be applied to a surface of a substrate.

In embodiments described herein, silica nanoparticles are a nanofeature that is mixed with an epoxy mixture as described above. The silica nanoparticles are said to be, e.g., an 8:1 ratio of 15 nm to 80 nm in particle size. The ratio is not particularly limited, but it can be a 6:1 to 10:1 ratio, for example an 8:1 ratio. For the sizes of the silica nanoparticles, the sizes represent a distribution of sizes of the nanoparticles, e.g., a distribution of sizes ranging from silica nanoparticles of 15 nm in size to nanoparticles of 80 nm in size. The distribution of silica nanoparticles is not limited to this distribution; the silica nanoparticles can be characterized by a monomodal particle size distribution of 10±5 nm, 10±1 nm, 15±5 nm, 15±1 nm, 20±5 nm, 20±1 nm, 25±5 nm, 25±1 nm, 30±5 nm, 30±1 nm, 35±5 nm, 35±1 nm, 40±5 nm, 40±1 nm, 45±5 nm, 45±1 nm, 50±5 nm, 50±1 nm, 55±5 nm, 55±1 nm, 60±5 nm, 60±1 nm, 65±5 nm, 65±1 nm, 70±5 nm, 70±1 nm, 75±5 nm, 75±1 nm, 80±5 nm, 80±1 nm, 85±5 nm, and 85±1 nm. The particle size distribution can also be bimodal, trimodal, or otherwise multi-modal with the median particle sizes listed above.

In embodiments described herein, different sizes of silica nanoparticles can be used, for example, comprising a ratio by mass of small particles to large particles, of from 6:1 to 10:1, of from 7:1 to 9:1, or of about 8:1. The small particles can have, for example, a maximum dimension (e.g., length or diameter) particle size range of from 10 nm to 30 nm and the large particles can have, for example, a maximum dimension particle size range of from 70 nm to 90 nm. In some embodiments, the small silica nanoparticles consist of silica nanoparticles having a maximum dimension of about 15 nm and the large silica nanoparticles consist of silica nanoparticles having a maximum dimension of about 80 nm.

In other embodiments, a nanofeature can be included in the coating, which comprises a nano-sized object other than silica nanoparticles. The nano-sized objects include, but are not limited to, nano-fibers, nano-tubes and other natural, manufactured and engineered components, said objects can have dimensions which are smaller than the wavelengths of visible, ultraviolet, and infrared light or selected ranges therein.

The silica nanoparticles can be spherical, plank-shaped, rod-shaped, flake-shaped, or rectangularly-shaped. As used herein, "spherical" does not refer to an ideal sphere but a sphere that is substantially spherical, e.g. characterized by a sphericity of at least 0.8. For the plank-shaped, rod-shaped, flake-shaped, and rectangularly-shaped nanoparticles, they can be characterized by an aspect ratio of, e.g., 1:1 to 5:1. The silica nanoparticles can be plank-shaped, rod-shaped, or flake-shaped, or is a dispersion of silica nanoparticles characterized by at least two of these shapes.

In embodiments described above, OPTIMA™ grade acetone is used as a solvent to dissolve the epoxy and expose silica nanoparticles in the epoxy basecoat. This is one example of the solvent, and any solvent can be used so long as it dissolves the epoxy binder. The amount is not particularly limited.

In embodiments described above, the self-assembling monolayer comprises a compound that is capable of forming a self-assembling monolayer, e.g. 1H,1H,2H,2H-perfluorooctyltrichlorosilane (FOTS). This compound can also or instead be perfluorodecyltrichlorosilane, 1H,1H,2H,2H-perfluorooctyltriethoxysilane, perfluorodecyltriethoxysilane, 1H,1H,2H,2H-perfluorodecyltriethoxysilane (tri-ethoxy), 1H,1H,2H,2H-perfluorooctyltrimethoxysilane 1H,1H,2H,2H-perfluorodecyltrimethoxysilane, or any combination thereof. The compound that is capable of forming the self-assembling monolayers can be represented by a Formula (I):

$$X_3\text{-Si}-R \qquad (I)$$

wherein each X represents F, Cl, Br, and/or alkoxy such as methoxy, ethoxy, propoxy, and butoxy, and wherein R represents a substantially fluorinated or perfluorinated alkyl group having from 4 to 12 carbon atoms.

Preferably, the perfluorinated alkyl group has from 6 to 10 carbons atoms, more preferably from 7 to 9 carbon atoms, and, for example, 8 carbon atoms, and at least 80% of the carbon atoms can be di-fluorinated are fluorinated.

As used herein, the term "perfluorinated" encompasses alkyl groups in which each hydrogen atom bound to the carbon atoms of the alkyl group is replaced with a fluorine atom. This term also encompasses alkyl groups where all but one, two, or three carbon atoms have only fluorine atoms bound thereto and these one, two, or three carbon atoms are not fully fluorinated.

In embodiments of the present invention, the compound that is capable of forming a self-assembling monolayer binds to the surface of the substrate and/or to the surface of the epoxy basecoat layer. Without wishing to be bound by any particular theory, it is believed that this compound binds to the surface via the Si—X3 moiety, where at least one X group is liberated from the silane and the compound forms a substrate-Si bond. The bond can be electrostatic (e.g. Van der Waals) or covalent.

In some embodiments of the present invention, 200-proof ethanol is used to dissolve the tri-ethoxy compound of the self-assembling monolayer. The 200-proof ethanol is also used to rinse, e.g., a surface of the self-assembling monolayer formed of the tri-ethoxy compound. The solvent is not particularly limited to 200-proof ethanol; it can be any solvent that is substantially anhydrous and is of sufficient polarity to dissolve the compound of the self-assembling monolayer. The term "substantially anhydrous" means a solvent that is no more than 10% by volume water.

In some embodiments of the present invention, at least two solvents of increasing polarity are used to rinse the self-assembling monolayer. The series of solvents can be n-decane, followed by chloroform, followed by methanol, but this is one example of a series of solvents used for rinsing.

In embodiments of the present invention, a plasma etch of a surface can take place. As described in some embodiments, the plasma etch takes place in a plasma chamber at a pressure lower than $2.5 \times 10^{-3}$ Torr. The pressure can be, e.g., $1 \times 10^{-6}$ Torr to less than $2.5 \times 10^{-3}$ Torr. The plasma can be oxygen plasma, or any other ionizable gas that forms a plasma, and the plasma etch can take place for a period of time of from 15 seconds to 5 minutes. The pressure of the plasma treatment can be from $2.5 \times 10^{-3}$ Torr to $1 \times 10^{-1}$ Torr. The voltage during plasma treatment can be from 1500 volts to 3000 volts, e.g. 2000 volts, with a modulating current of less than 0.2 Amps, e.g. 0.001 to 0.195 Amps.

The coatings of the present invention described herein can be self-cleaning. As used herein, the term "self-cleaning" refers to a coating that promotes the removal of a contaminate present on the surface of the coating. For example, the contaminate can be water, salt-water, dust, windshield washer fluid, antifreeze, power steering fluid, liquid glass cleaning compositions (e.g. WINDEX), coffee, optionally with at least one of cream and sugar, gasoline, diesel fluid, car-surface protectants (e.g. ARMOR ALL), sun-screen compositions, hand lotions, and bug repellants. The coatings can be characterized by a surface energy of not more than 30 dyne/cm$^2$, e.g. from 5 to 25 dyne/cm$^2$ (and all values therein), which can promote the self-cleaning nature of the coating.

In embodiments described above, a layer of fluorinated ethylene propylene 9494X is included in the coatings and it is formed by using a vacuum deposition process. Fluorinated ethylene propylene ("FEP") 9494X is one example of a fluorinated ethylene propylene compound that can be used to form this layer. Additional fluorinated ethylene propylene compounds that can be used included, for example, FEP 100X, FEP 100J, FEP 106X, FEP 9302X, FEP 9835X, FEP 9898, FEP CJ95X, FEP CJ99X, and FEP 9819FLX, also available from The Chemours Company, Wilmington, Del.

In each of the embodiments described herein, wherein one or more solvents is used, it is to be understood that different solvents than just those mentioned in the specific embodiment, can be used. Aliphatic solvents of substantially high vapor pressure can be used, for example, that will not evaporate too quickly or substantially. As an example, for embodiments wherein decane or n-decane is used, another different solvent can instead or additionally be used. Mineral oil can be used.

While the foregoing written description of the invention enables one of ordinary skill to make and use what is considered presently to be the best mode thereof, it should be understood that various changes, substitutions and alterations can be made herein without departing from the spirit and scope of the invention as defined by the appended claims. Therefore, the invention is not to be limited by the above described embodiment, method, and examples, but by all embodiments and methods within the scope and spirit of the invention as claimed.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. The term "about" refers to the value identified as an exact value, or as a value that deviates within the range of +/−5% or +/−5° of the value identified. Where a range of numerical values is recited herein, unless otherwise stated, the range is intended to include the endpoints thereof, and all integers and fractions within the range. It is not intended that the scope of the invention be limited to the specific values recited when defining a range. Further, in this application, a reference to an element by the indefinite article "a" or "an" does not exclude the possibility that more than one of the element or embodiment is present. The definite article "the" can, but not must, refer to a specific element or embodiment.

What is claimed is:

1. A method of applying a hydrophobic dust mitigating transparent coating to a substrate; said method comprising the steps of:
    making a nano-texture epoxy basecoat composition by mixing 0.55 g to 0.75 g of silica nanoparticles, an epoxy resin, an epoxy hardener, and a solvent, the silica nanoparticles comprising a ratio by mass of small particles to large particles, of from 6:1 to 10:1, the small particles having a maximum dimension particle size range of from 10 nm to 30 nm and the large particles having a maximum dimension particle size range of from 70 nm to 90 nm;
    cleaning a substrate and thereafter rinsing said substrate with a solvent;
    applying said epoxy basecoat composition to said substrate by rubbing the epoxy basecoat composition onto a surface of the substrate and allowing said epoxy basecoat composition to flash off and form a first basecoat;
    thinning out the first basecoat to form a transparent basecoat;
    baking said substrate with said transparent basecoat thereon at a temperature of from 75° C. to 125° C. for a period of time of from 15 minutes to 45 minutes to form a cured and set basecoat;
    applying a self-assembling, monolayer to said cured and set basecoat by submerging the substrate with the cured and set basecoat in a self-assembling monolayer solution comprising ethanol and 1H,1H,2H,2H-perfluorooctyltriethoxysilane, 1H,1H,2H,2H-perfluorodecyltrimethoxysilane, 1H,1H,2H,2H-perfluorodecyltriethoxysilane, or a combination thereof, for 12 to 20 hours to form a self-assembling monolayer on the cured and set basecoat;
    removing said substrate having the cured and set basecoat and the self-assembling monolayer thereon, from said solution;
    rinsing said self-assembling monolayer with ethanol;
    drying to obtain a dried coated assembly; and
    then baking the dried coated assembly at a temperature of from 75° C. to 125° C. for a period of time of from 15 minutes to 45 minutes such that the self-assembling monolayer aligns and forms a self-assembled monolayer.

2. The method of claim 1, further comprising:
    coating, in a vacuum deposition chamber, said self-assembled monolayer with 75 nm to 125 nm of a fluorinated ethylene propylene under a pressure of 1×10-5 Torr to 9×10-5 Torr at a deposition rate of from 15 to 25 µg/cm2, whereby
    said method produces a transparent coating exhibiting hydrophobicity such that contacting water forms droplets having contact angles averaging at least 90°.

3. The method according to claim 1, wherein the self-assembling monolayer solution comprises 1H,1H,2H,2H-perfluorooctyltriethoxysilane.

4. The method according to claim 1, wherein the small silica nanoparticles consist of silica nanoparticles having a maximum dimension of about 15 nm and the large silica nanoparticles consist of silica nanoparticles having a maximum dimension of about 80 nm.

5. The method according to claim 1, wherein the applying said epoxy basecoat composition and the thinning out comprise using lint-free, nonwoven cotton wipes.

6. The method according to claim 1, wherein the self-assembling monolayer solution comprises a combination of at least two of 1H,1H,2H,2H-perfluorooctyltriethoxysilane, 1H,1H,2H,2H-perfluorodecyltrimethoxysilane, and 1H,1H,2H,2H-perfluorodecyltriethoxysilane.

7. A method of applying a hydrophobic dust mitigating transparent coating to a substrate; said method comprising the steps of:
    making a nano-texture epoxy basecoat composition by mixing 0.1 to 0.5 g of silica nanoparticles, an epoxy resin, an epoxy hardener, and a solvent, the silica nanoparticles comprising a ratio by mass of small particles to large particles, of from 6:1 to 10:1, the small particles having a maximum dimension particle size range of from 10 nm to 30 nm and the large particles having a maximum dimension particle size range of from 70 nm to 90 nm;
    applying said epoxy basecoat composition to said substrate by rubbing the epoxy basecoat composition onto a surface of the substrate and allowing said epoxy basecoat composition to flash off and form a first basecoat;
    thinning out the first basecoat to form a transparent basecoat;
    baking said substrate with said transparent basecoat thereon at a temperature of from 75° C. to 125° C. for a period of time from 15 minutes to 45 minutes to form a cured and set basecoat;
    applying a self-assembling monolayer to said cured and set basecoat by submerging the substrate with the cured and set basecoat in a self-assembling monolayer solution comprising n-decane and perfluorodecyltrichlorosilane, 1H,1H,2H,2H-perfluorooctyltrichlorosilane, or a combination thereof, for a period of time from 15 minutes to 45 minutes to form a self-assembling monolayer on the cured and set basecoat;
    removing said substrate having the cured and set basecoat and self-assembling monolayer thereon, from said solution;
    rinsing said self-assembling monolayer with a first solvent having a first polarity and then with a second solvent having a second polarity that is greater than the first polarity, to remove unreacted perfluorodecyltrichlorosilane, unreacted 1H,1H,2H,2H-perfluorooctyltrichlorosilane, or both, to form a coated substrate; and then
    baking the coated substrate at a temperature of from 75° C. to 125° C. for a period of time from 15 minutes to 45 minutes such that the self-assembling monolayer aligns and forms a self-assembled monolayer, whereby
    said method produces a transparent coating exhibiting hydrophobicity such that contacting water forms droplets having contact angles averaging greater than 90°.

8. The method according to claim 7, wherein the self-assembling monolayer solution comprises perfluorodecyltrichlorosilane.

9. The method according to claim 7, wherein the self-assembling monolayer solution comprises 1H,1H,2H,2H-perfluorooctyltrichlorosilane.

10. The method according to claim 7, wherein the small silica nanoparticles consist of silica nanoparticles having a maximum dimension of about 15 nm and the large silica nanoparticles consist of silica nanoparticles having a maximum dimension of about 80 nm.

11. The method according to claim 7, wherein said method produces a transparent coating exhibiting hydrophobicity such that contacting water forms droplets having contact angles averaging at least 118°.

12. The method according to claim 7, wherein the self-assembling monolayer solution consists essentially of 1H,1H,2H,2H-perfluorooctyltrichlorosilane.

13. The method according to claim 7, wherein the self-assembling monolayer solution consists essentially of perfluorodecyltrichlorosilane and 1H,1H,2H,2H-perfluorooctyltrichlorosilane.

14. A method of applying a hydrophobic dust mitigating transparent coating to a substrate, said method comprising the steps of:
    making a nano-texture epoxy basecoat composition by mixing 0.1 to 0.5 g of silica nanoparticles, an epoxy resin, an epoxy hardener, and a solvent, the silica nanoparticles comprising a ratio by mass of small particles to large particles, of from 6:1 to 10:1, the small particles having a maximum dimension particle size range of from 10 nm to 30 nm and the large particles having a maximum dimension particle size range of from 70 nm to 90 nm;
    applying said epoxy basecoat composition to said substrate surface by rubbing the epoxy basecoat composition, using a lint-free nonwoven cotton wipe, onto the surface of the substrate and allowing said epoxy basecoat composition to flash off and turn matte in appearance;
    thereafter using a second lint-free nonwoven cotton wipe to thin out the epoxy basecoat composition and form a transparent basecoat; and
    baking said substrate with said transparent basecoat at a temperature of from 75° C. to 125° C. for a period of time of 15 minutes to 45 minutes to form a cured and set basecoat;
    applying a self-assembling monolayer to the substrate by submerging the substrate in a self-asset Ming monolayer solution comprising n-decane and 1H,1H,2H,2H-perfluorooctyltrichlorosilane, perfluorodecyltrichlorosilane, or both, for a period of time from 15 minutes to 45 minutes, and thereafter removing said substrate from said solution to form a coated substrate having a surface substrate coated with a self-assembling monolayer;
    rinsing said self-assembling monolayer with a first solvent having a first polarity and then with a second solvent having a second polarity that is greater than the first polarity, to remove unreacted 1H,1H,2H,2H-perfluorooctyltrichlorosilane, unreacted perfluorodecyltrichlorosilane, or both, and form a rinsed coated substrate; and then
    baking the rinsed coated substrate at a temperature of from 75° C. to 125° C. for a period of time from 15 minutes to 45 minutes, such that the self-assembling monolayer aligns and forms a self-assembled monolayer, whereby
    said method produces a transparent coating exhibiting hydrophobicity such that contacting water forms droplets having contact angles averaging greater than 90°.

15. The method according to claim 14, further comprising, prior to said applying:
    etching or forming the surface of the substrate to form an etched or formed substrate surface having nano-sized features.

16. The method according to claim 14, wherein said method produces a transparent coating exhibiting hydrophobicity such that contacting water forms droplets having contact angles averaging 120°.

17. The method according to claim 14, wherein the self-assembling monolayer solution comprises 1H,1H,2H,2H-perfluorooctyltrichlorosilane.

18. The method according to claim 14, wherein the self-assembling monolayer solution comprises perfluorodecyltrichlorosilane.

19. The method according to claim 14, further comprising coating, in a vacuum deposition chamber, said self-assembled monolayer with 75 nm to 125 nm of a fluorinated ethylene propylene under a pressure of $1\times10^{-5}$ Torr to $9\times10^{-5}$ Torr at a deposition rate of from 15 to 25 μg/cm2.

* * * * *